(12) United States Patent
Son et al.

(10) Patent No.: US 12,177,902 B2
(45) Date of Patent: *Dec. 24, 2024

(54) WIRELESS COMMUNICATION TERMINAL AND WIRELESS COMMUNICATION METHOD FOR CLEAR CHANNEL ALLOCATION

(71) Applicants: WILUS INSTITUTE OF STANDARDS AND TECHNOLOGY INC., Gyeonggi-do (KR); SK TELECOM CO., LTD., Seoul (KR)

(72) Inventors: Juhyung Son, Gyeonggi-do (KR); Jinsam Kwak, Gyeonggi-do (KR); Geonjung Ko, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,725

(22) Filed: Oct. 6, 2023

(65) Prior Publication Data

US 2024/0040623 A1    Feb. 1, 2024

Related U.S. Application Data

(63) Continuation of application No. 17/845,724, filed on Jun. 21, 2022, now Pat. No. 11,812,471, which is a
(Continued)

(30) Foreign Application Priority Data

Dec. 2, 2014   (KR) .................. 10-2014-0170812
Dec. 31, 2014  (KR) .................. 10-2014-0195876

(51) Int. Cl.
    *H04W 4/00*    (2018.01)
    *H04W 72/54*   (2023.01)
    (Continued)

(52) U.S. Cl.
    CPC ....... *H04W 74/0816* (2013.01); *H04W 72/54* (2023.01); *H04W 74/0808* (2013.01);
    (Continued)

(58) Field of Classification Search
None
See application file for complete search history.

(56) References Cited

U.S. PATENT DOCUMENTS 7,151,762 B1    12/2006   Ho et al.
7,864,744 B2     1/2011   Song et al.
(Continued)

FOREIGN PATENT DOCUMENTS

CN    1889492    1/2007
CN    1906868    1/2007
(Continued)

OTHER PUBLICATIONS

Notice of Allowance dated Dec. 4, 2023 for Japanese Patent Application No. 2022-001307 and its English translation provided by Applicant's foreign counsel.
(Continued)

*Primary Examiner* — Bob A Phunkulh
(74) *Attorney, Agent, or Firm* — WOMBLE BOND DICKINSON (US) LLP

(57) ABSTRACT

The present invention relates to a wireless communication terminal and wireless communication method for clear channel assessment, and more particularly, to a wireless communication terminal and a wireless communication method for performing an efficient clear channel assessment for spatial reuse of a communication system.

(Continued)

For this, provided are a wireless communication terminal comprising: a transceiver configured to transmit and receive a wireless signal; and a processor configured to control an operation of the terminal, wherein the processor is configured to: perform a backoff procedure of a channel for data transmission, suspend the backoff procedure when a wireless signal having a signal strength higher than a predetermined first clear channel assessment (CCA) threshold is received through the channel, identify whether the received wireless signal is a wireless signal of the same basic service set (BSS) as the terminal, and determine whether to resume the backoff procedure based on a CCA threshold determined according to the identification result and a wireless communication method using the same.

16 Claims, 25 Drawing Sheets

Related U.S. Application Data continuation of application No. 16/899,435, filed on Jun. 11, 2020, now Pat. No. 11,375,544, which is a continuation of application No. 15/611,668, filed on Jun. 1, 2017, now Pat. No. 10,701,732, which is a continuation of application No. PCT/KR2015/012947, filed on Dec. 1, 2015.

(51) Int. Cl.
*H04W 74/0808* (2024.01)
*H04W 74/0816* (2024.01)
*H04W 84/12* (2009.01)
H04B 17/318 (2015.01)
H04L 27/00 (2006.01)

(52) U.S. Cl.
CPC .......... *H04W 84/12* (2013.01); *H04B 17/318* (2015.01); *H04L 27/0006* (2013.01)

(56) References Cited

U.S. PATENT DOCUMENTS

| | | | |
|---|---|---|---|
| 7,885,287 B2 | 2/2011 | Bachrach et al. | |
| 8,391,374 B2 | 3/2013 | Husted et al. | |
| 8,937,968 B1 | 1/2015 | Venkatesh | |
| 9,198,194 B2 | 11/2015 | Meylan et al. | |
| 9,854,607 B1 | 12/2017 | Chu et al. | |
| 9,872,315 B2 | 1/2018 | Son et al. | |
| 2002/0060995 A1 | 5/2002 | Cervello et al. | |
| 2002/0120740 A1 | 8/2002 | Ho et al. | |
| 2003/0123405 A1 | 7/2003 | del Prado et al. | |
| 2004/0264504 A1 | 12/2004 | Jin | |
| 2005/0128977 A1 | 6/2005 | Kwak et al. | |
| 2006/0025128 A1 | 2/2006 | Lee | |
| 2006/0142020 A1 | 6/2006 | Mueckenheim et al. | |
| 2006/0221879 A1 | 10/2006 | Nakajima et al. | |
| 2006/0258350 A1 | 11/2006 | Roy et al. | |
| 2007/0263654 A1 | 11/2007 | Salokannel et al. | |
| 2007/0286122 A1 | 12/2007 | Fonseca | |
| 2008/0008133 A1 | 1/2008 | Zhu et al. | |
| 2008/0151849 A1 | 6/2008 | Utsunomiya et al. | |
| 2009/0257362 A1 | 10/2009 | Marinier et al. | |
| 2009/0279514 A1 | 11/2009 | Seok | |
| 2010/0067473 A1 | 3/2010 | Cave et al. | |
| 2010/0105389 A1 | 4/2010 | Chin et al. | |
| 2010/0260159 A1 | 10/2010 | Zhang et al. | |
| 2010/0290416 A1 | 11/2010 | Ko et al. | |
| 2011/0044257 A1 | 2/2011 | Utsunomiya et al. | |
| 2011/0069670 A1 | 3/2011 | Lee et al. | |
| 2011/0098046 A1 | 4/2011 | Shin | |
| 2011/0116401 A1 | 5/2011 | Banerjea et al. | |
| 2011/0194431 A1 | 8/2011 | Yong et al. | |
| 2011/0305139 A1 | 12/2011 | Kwak et al. | |
| 2012/0044879 A1 | 2/2012 | Park | |
| 2012/0063433 A1 | 3/2012 | Wentink | |
| 2012/0069746 A1 | 3/2012 | Park | |
| 2012/0200397 A1 | 8/2012 | Nakajima et al. | |
| 2012/0218983 A1 | 8/2012 | Noh et al. | |
| 2013/0024292 A1 | 1/2013 | David | |
| 2013/0145224 A1 | 6/2013 | Kim et al. | |
| 2013/0150012 A1* | 6/2013 | Chhabra | H04W 48/16 455/418 |
| 2013/0201835 A1 | 8/2013 | Banerjea et al. | |
| 2013/0242928 A1 | 9/2013 | Goel et al. | |
| 2014/0036705 A1 | 2/2014 | Ma | |
| 2014/0086200 A1 | 3/2014 | Seok | |
| 2014/0112175 A1 | 4/2014 | Ou et al. | |
| 2014/0112273 A1 | 4/2014 | Aboul-Magd et al. | |
| 2014/0119303 A1 | 5/2014 | Kwon et al. | |
| 2014/0169290 A1 | 6/2014 | Seok | |
| 2014/0198741 A1 | 7/2014 | Barriac et al. | |
| 2014/0226505 A1 | 8/2014 | Sadek | |
| 2014/0269353 A1 | 9/2014 | Yang et al. | |
| 2014/0269544 A1 | 9/2014 | Zhu et al. | |
| 2014/0293905 A1 | 10/2014 | Tian et al. | |
| 2014/0314003 A1 | 10/2014 | Zhou et al. | |
| 2015/0009907 A1 | 1/2015 | Merlin et al. | |
| 2015/0023335 A1 | 1/2015 | Vermani et al. | |
| 2015/0078215 A1 | 3/2015 | Zhou et al. | |
| 2015/0139206 A1 | 5/2015 | Azizi et al. | |
| 2015/0163824 A1 | 6/2015 | Krzymien et al. | |
| 2015/0264617 A1 | 9/2015 | Choudhury et al. | |
| 2015/0319700 A1 | 11/2015 | Oteri et al. | |
| 2015/0373639 A1* | 12/2015 | Zhou | H04W 48/16 370/311 |
| 2016/0007274 A1* | 1/2016 | Park | H04W 48/16 455/434 |
| 2016/0043949 A1 | 2/2016 | Lee et al. | |
| 2016/0050691 A1 | 2/2016 | Jauh et al. | |
| 2016/0066349 A1 | 3/2016 | Seok | |
| 2016/0081010 A1 | 3/2016 | Seok | |
| 2016/0105888 A1 | 4/2016 | Seok | |
| 2016/0143058 A1 | 5/2016 | Son et al. | |
| 2016/0242210 A1 | 8/2016 | Seok | |
| 2016/0286499 A1 | 9/2016 | Lim et al. | |
| 2016/0302156 A1 | 10/2016 | Choi et al. | |
| 2016/0338047 A1 | 11/2016 | Seok | |
| 2016/0381646 A1 | 12/2016 | Li et al. | |
| 2017/0079067 A1* | 3/2017 | Li | H04W 72/30 |
| 2017/0134975 A1 | 5/2017 | Huang et al. | |
| 2017/0164406 A1 | 6/2017 | Son et al. | |
| 2017/0202024 A1 | 7/2017 | Son et al. | |
| 2017/0245164 A1 | 8/2017 | Jiang et al. | |
| 2017/0332405 A1 | 11/2017 | Son et al. | |
| 2017/0367119 A1 | 12/2017 | Son et al. | |
| 2020/0305196 A1 | 9/2020 | Son et al. | |
| 2022/0322441 A1 | 10/2022 | Son et al. | |

FOREIGN PATENT DOCUMENTS

| | | |
|---|---|---|
| CN | 101253784 | 8/2008 |
| CN | 102067652 | 5/2011 |
| CN | 1992978 | 1/2012 |
| CN | 102624414 | 8/2012 |
| CN | 102656822 | 9/2012 |
| CN | 102656941 | 9/2012 |
| CN | 102714526 | 10/2012 |
| CN | 102781077 | 11/2012 |
| CN | 102983918 | 3/2013 |
| CN | 103053214 | 4/2013 |
| CN | 103260168 | 8/2013 |
| CN | 103430601 | 12/2013 |
| CN | 103765963 | 4/2014 |
| CN | 103906256 | 7/2014 |
| CN | 103918346 | 7/2014 |
| CN | 104038950 | 9/2014 |
| CN | 104066091 | 9/2014 |
| CN | 104115541 | 10/2014 |
| CN | 102843752 | 12/2014 |
| CN | 103634855 | 7/2015 |
| EP | 2 775 776 | 9/2014 |

(56) References Cited

FOREIGN PATENT DOCUMENTS

| | | |
|---|---|---|
| EP | 3 185 637 | 6/2017 |
| JP | 2002-10341 | 1/2002 |
| JP | 2006-279337 | 10/2006 |
| JP | 2013-207383 | 10/2013 |
| JP | 2015-534418 | 11/2015 |
| JP | 2016-510579 | 4/2016 |
| JP | 2017-517216 | 6/2017 |
| JP | 2018-186541 | 11/2018 |
| KR | 10-0218868 | 9/1999 |
| KR | 10-2005-0119107 | 12/2005 |
| KR | 10-2006-0029046 | 4/2006 |
| KR | 10-2006-0081017 | 7/2006 |
| KR | 10-2008-0113100 | 12/2008 |
| KR | 10-0946234 | 3/2010 |
| KR | 10-2010-0092103 | 8/2010 |
| KR | 10-2013-0036861 | 4/2013 |
| KR | 10-2013-0069529 | 6/2013 |
| KR | 10-2014-0052704 | 5/2014 |
| KR | 10-2014-0056064 | 5/2014 |
| TW | 201427448 | 7/2014 |
| WO | 02/054671 | 7/2002 |
| WO | 2004/079948 | 9/2004 |
| WO | 2010/085093 | 7/2010 |
| WO | 2011/053026 | 5/2011 |
| WO | 2013/077600 | 5/2013 |
| WO | 2013/118996 | 8/2013 |
| WO | 2014/030983 | 2/2014 |
| WO | 2014/039380 | 3/2014 |
| WO | 2014/042434 | 3/2014 |
| WO | 2014/061978 | 4/2014 |
| WO | 2014/071308 | 5/2014 |
| WO | 2014/110397 | 7/2014 |
| WO | 2014/112707 | 7/2014 |
| WO | 2014/137172 | 9/2014 |
| WO | 2014/178502 | 11/2014 |
| WO | 2014/178678 | 11/2014 |
| WO | 2016/089069 | 6/2016 |

OTHER PUBLICATIONS

Notice of Allowance dated Dec. 15, 2023 for Chinese Patent Application No. 202110013299.4 and its English translation provided by Applicant's foreign counsel.
Notice of Allowance dated Dec. 20, 2023 for Chinese Patent Application No. 202110013297.5 and its English translation provided by Applicant's foreign counsel.
Office Action dated Dec. 29, 2023 for Chinese Patent Application No. 202011124517.3 and its English translation provided by Applicant's foreign counsel.
International Search Report for PCT/KR2015/012947 mailed on Mar. 31, 2016 and its English translation from WIPO (published as WO 2016/089069).
Written Opinion of the International Searching Authority for PCT/KR2015/012947 mailed on Mar. 31, 2016 and its English translation from WIPO (published as WO 2016/089069).
International Preliminary Report on Patentability (Chapter I) for PCT/KR2015/012947 issued on Jun. 6, 2017 and its English translation from WIPO.
Office Action dated Jan. 18, 2016 for Korean Patent Application No. 10-2015-7036315 and its English translation provided by Applicant's foreign council.
Decision for Grant dated Apr. 7, 2016 for Korean Patent Application No. 10-2015-7036315 and its English translation provided by Applicant's foreign council.
Non-Final Office Action dated Nov. 29, 2016 for U.S. Appl. No. 14/904,079.
Final Office Action dated Jan. 31, 2017 for U.S. Appl. No. 14/904,079.
Notice of Allowance dated Mar. 16, 2017 for U.S. Appl. No. 14/904,079.
Non-Final Office Action dated May 17, 2017 for U.S. Appl. No. 15/470,906.
Notice of Allowance dated Sep. 7, 2017 for U.S. Appl. No. 15/470,906.
Non-Final Office Action dated Jan. 9, 2019 for U.S. Appl. No. 15/848,343.
Notice of Allowance dated Jun. 7, 2019 for U.S. Appl. No. 15/848,343.
Notice of Allowance dated Sep. 25, 2019 for U.S. Appl. No. 15/848,343.
Notice of Allowance dated Sep. 25, 2019 for Chinese Patent Application No. 201580025030.0 and its English translation provided by Applicant's foreign council.
Decision for Grant dated Sep. 25, 2019 for Korean Patent Application No. 10-2017-7004200 and its English translation provided by Applicant's foreign council.
Decision for Grant dated Sep. 25, 2019 for Korean Patent Application No. 10-2019-7025938 and its English translation provided by Applicant's foreign council.
Notice of Allowance dated May 11, 2017 for U.S. Appl. No. 15/435,261.
Notice of Allowance dated Oct. 30, 2017 for U.S. Appl. No. 15/674,501.
Non-Final Office Action dated Feb. 13, 2019 for U.S. Appl. No. 15/912,570.
Notice of Allowance dated May 24, 2019 for U.S. Appl. No. 15/912,570.
Office Action dated Feb. 20, 2018 for Japanese Patent Application No. 2017-510298 and its English translation from Global Dossier.
John (Ju-Hyung) Son et al. (Wilus Institute); "Further Considerations on Enhanced CCA for 11ax"; doc.: IEEE 802.11-14/0847r1, [online] Jul. 15, 2014, slides 1-12.
Notice of Allowance dated Jun. 5, 2018 for Japanese Patent Application No. 2017-510298 and its English translation from Global Dossier.
Notice of Allowance dated Apr. 2, 2019 for Japanese Patent Application No. 2018-127641 and its English translation from Global Dossier.
Extended European Search Report dated Mar. 2, 2018 for European Patent Application No. 15 833 905.1.
James Wang (Mediatek) et al.; Spatial Reuse and Coexistence with Legacy Devices; doc: IEEE 802.11-14/0637r0, May 13, 2014, pp. 1-10.
Office Action dated Jun. 21, 2019 for European Patent Application No. 15 833 905.1.
Office Action dated Jul. 25, 2019 for Chinese Patent Application No. 201580044265.4 and its English translation provided by Applicant's foreign council.
Office Action dated Jul. 29, 2019 for Chinese Patent Application No. 201580065633.3 and its English translation provided by Applicant's foreign council.
Office Action dated Mar. 15, 2019 for Chinese Application No. 201580025030.0 and its English translation provided by Applicant's foreign council.
Notice of Allowance dated Feb. 25, 2020 for U.S. Appl. No. 15/611,668 (now published as US 2017/0332405).
Non-Final Office Action dated Nov. 13, 2019 for U.S. Appl. No. 15/611,668 (now published as US 2017/0332405).
Final Office Action dated Jul. 17, 2019 for U.S. Appl. No. 15/611,668 (now published as US 2017/0332405).
Non-Final Office Action dated Feb. 7, 2019 for U.S. Appl. No. 15/611,668 (now published as US 2017/0332405).
Office Action dated May 7, 2020 for Chinese Patent Application No. 201580044265.4 and its English translation provided by Applicant's foreign counsel.
Office Action dated Jun. 2, 2020 for Japanese Patent Application No. 2019-102819 and its English translation provided by Applicant's foreign counsel.
Office Action dated Jun. 22, 2020 for Indian Patent Application No. 201737020028.
Notice of Allowance dated Feb. 3, 2021 for Korean Patent Application No. 10-2016-7035621 and its English translation provided by Applicant's foreign counsel.
Office Action dated Jan. 5, 2021 for Japanese Patent Application No. 2019-102819 and its English translation provided by Applicant's foreign counsel.

(56) References Cited

OTHER PUBLICATIONS

Office Action dated Mar. 17, 2021 for Korean Patent Application No. 10-2017-7014696 and its English translation provided by Applicant's foreign counsel.
Geonjung Ko et al: "Performance Evaluation of Legacy Fairness with Enhanced CCA in Wireless LAN", Wilus Institute, Inc., Jun. 2015, pp. 144-145.
Notice of Allowance dated Aug. 5, 2020 for Chinese Patent Application No. 201580044265.4 and its English translation provided by Applicant's foreign counsel.
Notice of Allowance dated Oct. 22, 2020 for Chinese Patent Application No. 201580065633.3 and its English translation provided by Applicant's foreign counsel.
Office Action dated Oct. 19, 2020 for Korean Patent Application No. 10-2016-7035621 and its English translation provided by Applicant's foreign counsel.
Office Action dated Sep. 9, 2021 for Korean Patent Application No. 10-2021-7013346 and its English translation provided by Applicant's foreign counsel.
Office Action dated Jul. 28, 2021 for Chinese Patent Application No. 201911250539.1 and its English translation provided by Applicant's foreign counsel.
Office Action dated Aug. 30, 2021 for U.S. Appl. No. 16/899,397.
Office Action dated Oct. 13, 2021 for Korean Patent Application No. 10-2021-7031320 and its English translation provided by Applicant's foreign counsel.
Office Action dated Oct. 16, 2021 for Korean Patent Application No. 10-2021-7031305 and its English translation provided by Applicant's foreign counsel.
Office Action dated Apr. 27, 2022 for Korean Patent Application No. 10-2021-7031320 and its English translation provided by Applicant's foreign counsel.
Notice of Allowance dated Apr. 27, 2022 for Korean Patent Application No. 10-2021-7031305 and its English translation provided by Applicant's foreign counsel.
Notice of Allowance dated Feb. 10, 2022 for U.S. Appl. No. 16/899,435 (now published as US 2020/0305196).
Office Action dated Oct. 13, 2021 for U.S. Appl. No. 16/899,435 (now published as US 2020/0305196).
Notice of Allowance dated Aug. 30, 2023 for Korean Patent Application No. 10-2022-7030871 and its English translation provided by Applicant's foreign counsel.
Hearing Notice dated Sep. 15, 2023 for Indian Patent Application No. 201637036755.
Office Action dated Jun. 19, 2023 for Chinese Patent Application No. 202011124517.3 and its English translation provided by Applicant's foreign counsel.
John (Ju-Hyung) Son et al.: "Further Considerations on Enhanced CCA for 11ax", doc.: IEEE 802.11-14/0847r1, Jul. 15, 2014, slides 1-12.
Office Action dated Jul. 5, 2023 for Chinese Patent Application No. 202110013299.4 and its English translation provided by Applicant's foreign counsel.
Office Action dated Jul. 5, 2023 for Chinese Patent Application No. 202110013297.5 and its English translation provided by Applicant's foreign counsel.
Notice of Allowance dated Jul. 5, 2023 for Chinese Patent Application No. 202011126727.6 and its English translation provided by Applicant's foreign counsel.
Telefon AB LM Ericsson: "Applying Data Redundancy for CSD Services in AoIP", 3GPP TSG GERAN #39, GP-081388, Florence, Italy, Aug. 28, 2008, pp. 1-15.
Notice of Allowance dated Jun. 30, 2023 for Chinese Patent Application No. 202110012523.8 and its English translation provided by Applicant's foreign counsel.
3GPP TS 36.300 V9.3.0 (Mar. 2010): "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", Apr. 27, 2010, pp. 1-187.
Office Action dated Mar. 13, 2023 for Japanese Patent Application No. 2022-001307 and its English translation provided by Applicant's foreign counsel.
Notice of Allowance dated Apr. 26, 2023 for Chinese Patent Application No. 201911250561.6 and its English translation provided by Applicant's foreign counsel.
Office Action dated Dec. 5, 2022 for Chinese Patent Application No. 201911250561.6 and its English translation provided by Applicant's foreign counsel.
Ericsson: "Additional Control procedure during inter-BSS Handover", 3GPP TSG CT Meeting #55, CP-120207, Xiamen, People's Republic of China, Feb. 29-Mar. 2, 2012, pp. 1-25.
IIT Bombay: "Viability of Channel Utilization to predict WLAN performance", 3GPP TSG-RAN WG2 86, R2-142698, Seoul, South Korea, May 19-23, 2014, pp. 1-4.
Office Action dated Dec. 22, 2022 for European Patent Application No. 15 833 905.1.
Notice of Allowance dated Jan. 31, 2023 for Korean Patent Application No. 10-2022-7022404 and its English translation provided by Applicant's foreign counsel.
Office Action dated Jul. 26, 2022 for Korean Patent Application No. 10-2022-7022404 and its English translation provided by Applicant's foreign counsel.
Imad Jamil et al.: "Improving the Capacity of Future IEEE 802.11 High Efficiency WLANs", IEEE ICT 2014, pp. 303-307.
Notice of Allowance dated Aug. 4, 2022 for Korean Patent Application No. 10-2021-7031320 and its English translation provided by Applicant's foreign counsel.
Office Action dated Oct. 21, 2022 for Korean Patent Application No. 10-2022-7030871 and its English translation provided by Applicant's foreign counsel.
Notice of Allowance dated Jun. 23, 2023 for U.S. Appl. No. 17/845,724 (now published as US 2022/0322441).
Office Action dated Feb. 27, 2023 for U.S. Appl. No. 17/845,724 (now published as US 2022/0322441).
Office Action dated Apr. 12, 2024 for Chinese Patent Application No. 202011124517.3 and its English translation provided by Applicant's foreign counsel.
Office Action dated May 31, 2024 for European Patent Application No. 15 833 905.1.
Office Action dated Feb. 9, 2024 for Korean Patent Application No. 10-2023-7041411 and its English translation provided by Applicant's foreign counsel.

\* cited by examiner

| BSS Identifier | BSS Identifier Information (BSS Color) |
|---|---|
| 1011...1000 | 000 |
| 1110...0101 | 101 |
| 0101...1101 | 101 |
| 1101...0111 | 111 |
| 0010...0001 | 001 |
| 1010...1011 | 011 |
| 0000...0011 | 011 |
| 0100...0000 | 000 |
| 0110...0110 | 110 |

*FIG. 15*

| Rate Bit Field | Existing information | | | BSS Identifier Information |
|---|---|---|---|---|
| | Data Rate (Mbps) | Modulation Scheme | Coding Rate | |
| 1101 | 6 | BPSK | 1/2 | - |
| 1111 | 9 | BPSK | 3/4 | - |
| 0101 | 12 | QPSK | 1/2 | - |
| 0111 | 18 | QPSK | 3/4 | - |
| 1001 | 24 | 16-QAM | 1/2 | - |
| 1011 | 36 | 16-QAM | 3/4 | - |
| 0001 | 48 | 64-QAM | 2/3 | - |
| 0011 | 54 | 64-QAM | 3/4 | - |
| 1100 | - | - | - | 110 |
| 1110 | - | - | - | 111 |
| 0100 | - | - | - | 010 |
| 0110 | - | - | - | 011 |
| 1000 | - | - | - | 100 |
| 1010 | - | - | - | 101 |
| 0000 | - | - | - | 000 |
| 0010 | - | - | - | 001 |

*FIG. 18*

WIRELESS COMMUNICATION TERMINAL AND WIRELESS COMMUNICATION METHOD FOR CLEAR CHANNEL ALLOCATION

CROSS-REFERENCE TO RELATED APPLICATIONS

This application is a continuation of U.S. patent application Ser. No. 17/845,724 filed on Jun. 21, 2022, which is a continuation of U.S. patent application Ser. No. 16/899,435 filed on Jun. 11, 2020, issued as U.S. Pat. No. 11,375,544 dated Jun. 28, 2022, which is a continuation of U.S. patent application Ser. No. 15/611,668 filed on Jun. 1, 2017, issued as U.S. Pat. No. 10,701,732, dated Jun. 30, 2020, which a continuation of International Patent Application No. PCT/KR2015/012947 filed on Dec. 1, 2015, which claims the priority to Korean Patent Application No. 10-2014-0170812 filed in the Korean Intellectual Property Office on Dec. 2, 2014, and Korean Patent Application No. 10-2014-0195876 filed in the Korean Intellectual Property Office on Dec. 31, 2014, the entire contents of which are incorporated herein by reference.

TECHNICAL FIELD

The present invention relates to a wireless communication terminal and wireless communication method for clear channel assessment, and more particularly, to a wireless communication terminal and a wireless communication method for performing an efficient clear channel assessment for spatial reuse of a communication system.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

As described above, an object of the present invention is to provide high-efficiency/high-performance wireless LAN communication in a high-density environment.

In particular, an object of the present invention is to provide a method for efficiently transmitting data in an overlapped basic service set (BSS) environment.

Further, another object of the present invention is to increase a transmission opportunity and transmission rate of data by providing an efficient spatial reuse method in the overlapped BSS environment.

Further, another object of the present invention is to eliminate the unfairness problem of a legacy terminal that may occur when an adjusted CCA threshold is used for channel access.

Technical Solution

In order to achieve the objects, the present invention provides a wireless communication method and a wireless communication terminal as below.

First, the present invention provides a wireless communication terminal including: a transceiver for transmitting and receiving a wireless signal; and a processor for controlling an operation of the terminal, wherein the processor measures a signal strength of a wireless signal of a specific channel received through the transceiver, and determines whether the specific channel is busy based on the measured signal strength and BSS identifier information of the wireless signal.

In this case, the processor may perform the determination based on clear channel assessment (CCA) for the specific channel, and a CCA threshold used for the CCA may be set to different levels according to whether the BSS identifier information of the wireless signal is the same as BSS identifier information of the terminal.

Further, when the BSS identifier information of the wireless signal is the same as BSS identifier information of the terminal, a first CCA threshold may be used for the CCA and when the BSS identifier information of the wireless signal is different from BSS identifier information of the terminal, a second CCA threshold having a higher level than the first CCA threshold may be used for the CCA.

In addition, the processor may obtains at least one of legacy wireless LAN information and non-legacy wireless LAN information by using preamble information of the received wireless signal, and may determine whether the specific channel is busy based on the BSS identifier information of the wireless signal when the non-legacy wireless LAN information is obtained from the wireless signal.

Next, the present invention provides a wireless communication terminal including: a transceiver for transmitting and receiving a wireless signal; and a processor for controlling an operation of the terminal, wherein the processor measures a signal strength of a wireless signal of a specific channel received through the transceiver, obtains at least one of legacy wireless LAN information and non-legacy wireless LAN information by using preamble information of the received wireless signal, and determines whether the specific channel is busy based on BSS identifier information of the wireless signal when the measured signal strength is between a first clear channel assessment (CCA) threshold and a second CCA threshold and the non-legacy wireless LAN information is obtained from the wireless signal.

In this case, the BSS identifier information of the wireless signal may represent abbreviated information of a BSS identifier for the wireless signal.

Further, the processor may determine whether the specific channel is busy based on a result of comparing the BSS identifier information of the wireless signal and the BSS identifier information of the terminal.

In this case, the processor may determine that the specific channel is in an idle state when the BSS identifier information of the wireless signal is different from the BSS identifier information of the terminal.

Further, the processor may determine that the specific channel is in a busy state when the BSS identifier information of the wireless signal is the same as the BSS identifier information of the terminal.

In addition, the wireless signal may include a first preamble for a legacy terminal and a second preamble for a non-legacy terminal, and the BSS identifier information of the wireless signal may be extracted from the second preamble of the wireless signal.

In addition, the wireless signal may include the first preamble for the legacy terminal and the second preamble for the non-legacy terminal and the first preamble may be configured to at least include a first subcarrier set for the legacy terminal, and when the first preamble is configured to additionally include a second subcarrier set different from the first subcarrier set, the non-legacy wireless LAN information may be obtained from the second subcarrier set.

In this case, the BSS identifier information of the received wireless signal may be extracted from information on the second subcarrier set of the first preamble.

Further, the wireless signal may include the first preamble for the legacy terminal and the second preamble for the non-legacy terminal, and whether the wireless signal includes the non-legacy wireless LAN information may be determined based on information on predetermined bits of the first preamble.

In addition, the wireless signal may include the first preamble for the legacy terminal and the second preamble for the non-legacy terminal, and the BSS identifier information of the wireless signal may be extracted from the predetermined bit field of the first preamble.

In this case, a predetermined bit of the predetermined bit field may represent whether the wireless signal includes the non-legacy wireless LAN information, and when the predetermined bit represents that the wireless signal includes the non-legacy wireless LAN information, the BSS identifier information of the wireless signal may be extracted from the predetermined bit field.

In addition, the first preamble may be configured to at least include the first subcarrier set for the legacy terminal, and when the first preamble is configured to additionally include the second subcarrier set different from the first subcarrier set, the BSS identifier information of the wireless signal may be extracted from the predetermined bit field.

Next, the present invention provides a wireless communication terminal including: a transceiver for transmitting and receiving a wireless signal; and a processor controlling an operation of the terminal, wherein the processor performs a backoff procedure of a channel for data transmission, suspends the backoff procedure when a wireless signal having a signal strength higher than a predetermined first clear channel assessment (CCA) threshold is received through the channel, identifies whether the received wireless signal is a wireless signal of the same basic service set (BSS) as the terminal, and determines whether to resume the backoff procedure based on a CCA threshold determined according to the identification result.

In this case, the processor may determine whether to resume the backoff procedure using a second CCA threshold higher than the first CCA threshold when the wireless signal is determined to be a wireless signal of a different BSS with the terminal.

Further, the processor may determine that the channel is busy and continue to suspend the backoff procedure when the signal strength of the wireless signal is higher than the second CCA threshold.

Further, the processor may determine that the channel is idle and resume the backoff procedure after a predetermined IFS time when the signal strength of the wireless signal is lower than the second CCA threshold.

In addition, whether the received wireless signal is a wireless signal of the same BSS as the terminal may be identified based on BSS color information or MAC address information extracted from the wireless signal.

In addition, the BSS color information may be abbreviated information of a BSS identifier.

In addition, the wireless signal may be identified to be a wireless signal of the same BSS as the terminal when the wireless signal is a frame of a predetermined format not including the BSS identifier information.

In this case, the frame of the predetermined format may include a legacy CTS frame.

Further, the processor may determine that the channel is busy and continue to suspend the backoff procedure when the wireless signal is identified to be a wireless signal of the same BSS as the terminal.

Next, the present invention provides a wireless communication method of a terminal including: receiving a wireless signal of a specific channel; measuring a signal strength of the received wireless signal; and determining whether the specific channel is busy based on the measured signal strength and BSS identifier information of the wireless signal.

Next, the present invention provides a wireless communication method of a terminal including: receiving a wireless signal of a specific channel; measuring a signal strength of the received wireless signal; obtaining at least one of legacy wireless LAN information and non-legacy wireless LAN information by using preamble information of the received wireless signal; and determining whether the specific channel is busy based on BSS identifier information of the wireless signal when the measured signal strength is between a first clear channel assessment (CCA) threshold and a second CCA threshold and the non-legacy wireless LAN information is obtained from the wireless signal.

Next, the present invention provides a wireless communication method of a terminal, the method comprising: performing a backoff procedure of a channel for data transmission; suspending the backoff procedure when a wireless signal having a signal strength higher than a predetermined first clear channel assessment (CCA) threshold is received through the channel; identifying whether the received wireless signal is a wireless signal of the same basic service set (BSS) as the terminal; and determining whether to resume the backoff procedure based on a CCA threshold determined according to the identification result.

Advantageous Effects

According to embodiments of the present invention, it can be efficiently determined whether a wireless signal received in an overlapped BSS environment is a wireless LAN signal of the same BSS and whether to adaptively use the corresponding channel can be decided based on the determination.

Further, according to another embodiment of the present invention, when the received wireless signal is a legacy wireless LAN signal from which BSS identifier information is not extracted, whether the channel is in a busy state is determined according to a received signal strength of the corresponding signal in a lump to minimize a time delay required to additionally determine a BSS identifier of the legacy wireless LAN signal during a CCA process.

Further, according to another embodiment of the present invention, when a wireless LAN signal having the same BSS identifier information as that of a terminal is received, an inequity problem in which different CCA thresholds are applied according to whether the corresponding wireless LAN signal includes non-legacy wireless LAN information can be resolved. That is, CCA thresholds for a legacy signal and a non-legacy signal are similarly applied to the wireless LAN signal having the same BSS identifier information as that of the terminal to maintain equity for channel occupation between a legacy terminal and a non-legacy terminal.

According to yet another embodiment of the present invention, since at least some of non-legacy wireless LAN information such as the BSS identifier information can be obtained from a legacy preamble before checking a non-legacy preamble, CCA may be performed within a shorter time.

According to still another embodiment of the present invention, the BSS identifier information is inserted into the legacy signal so that the non-legacy terminals can apply the CCA threshold differently.

According to the embodiment of the present invention, when a plurality of data frames are simultaneously transmitted, overlapping of the preamble portions between each other is avoided, so that the transmission success rate of each frame can be increased.

DESCRIPTION OF DRAWINGS

FIG. 15 is a diagram illustrating a method for representing BSS identifier information according to an embodiment of the present invention.

FIG. 18 is a diagram illustrating a method for representing non-legacy wireless LAN information by using a predetermined bit field of the legacy preamble.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2014-0170812 and 10-2014-0195876 filed in the Korean Intellectual Property Office and the embodiments and mentioned items described in the respective applications are included in the Detailed Description of the present application.

Figure 1:
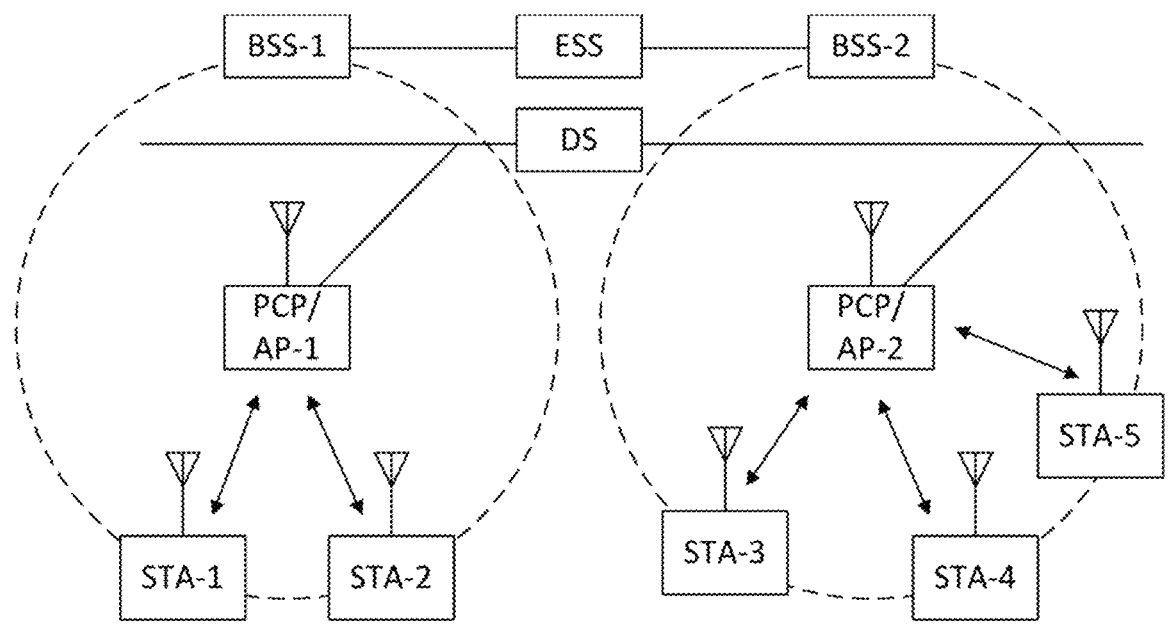
FIG. 1 is a diagram illustrating a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
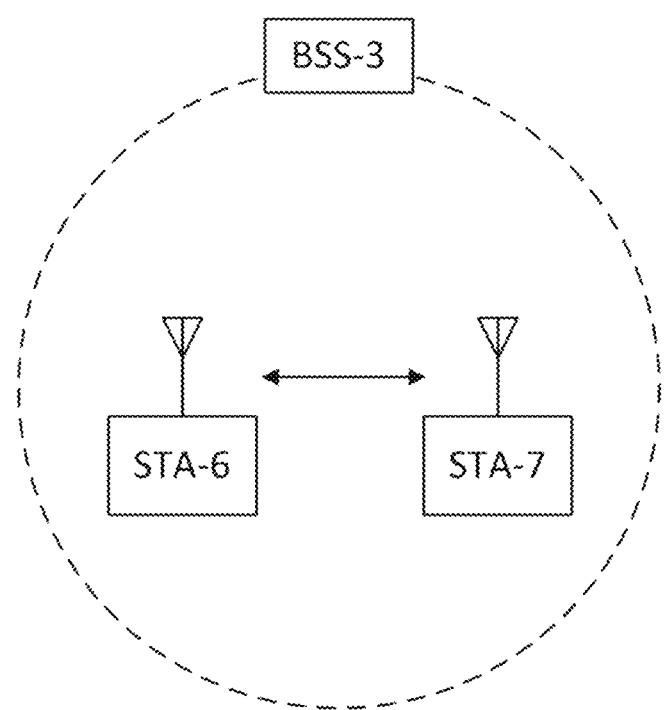
FIG. 2 is a diagram illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
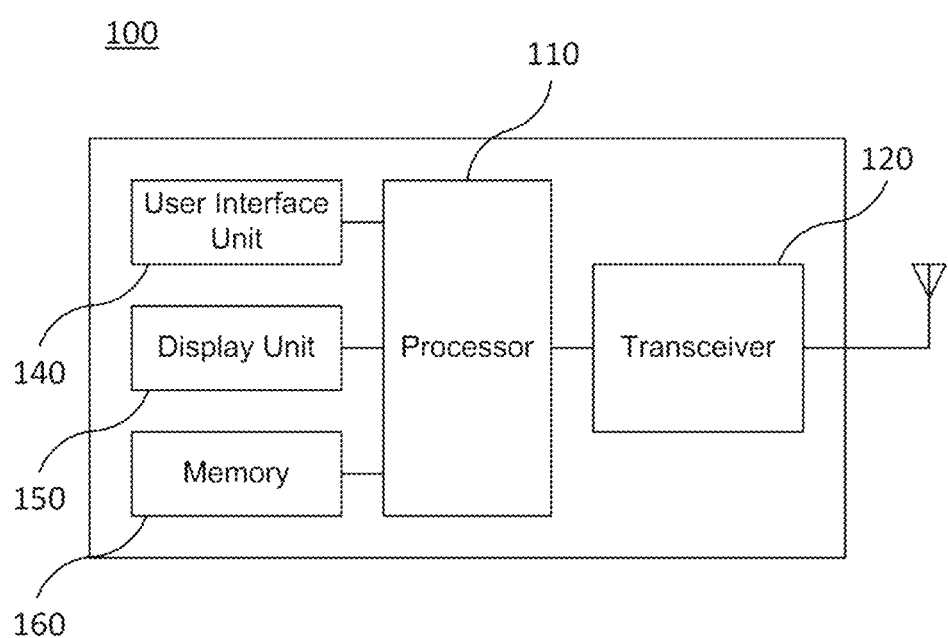
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
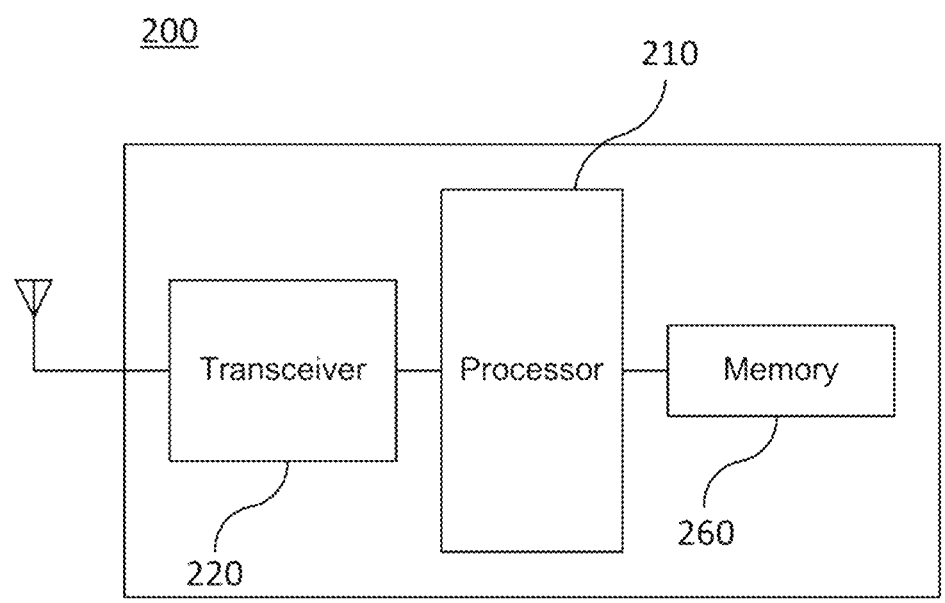
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as wireless signal transmission/reception of the AP 200 according to the embodiment of the present invention. A detailed embodiment thereof will be described below.

Figure 5:
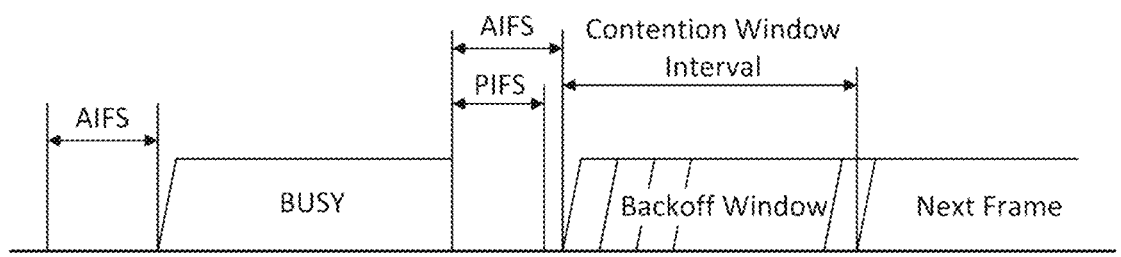
FIG. 5 is a diagram illustrating a carrier sense multiple access (CSMA)/collision avoidance (CA) method used in wireless LAN communication.

FIG. 5 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number assigned to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 6:
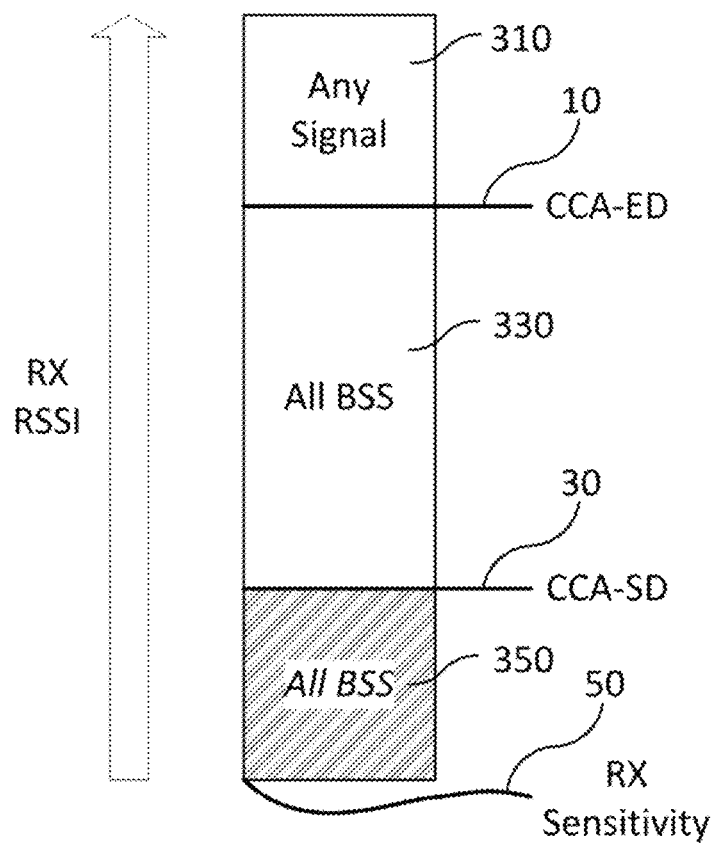
FIG. 6 is a diagram illustrating one embodiment of a wireless communication scheme using a CCA technique.

FIG. 6 is a diagram illustrating one embodiment of a wireless communication scheme using a CCA technique.

In wireless communication, for instance, the wireless LAN communication, whether the channel is busy may be sensed through the CCA. In this case, the CCA methods including a signal detection (SD) method, an energy detection (ED) method, a correlation detection (CD) method, and the like may be used.

First, the signal detection (CCA-SD) is a method that measures a signal strength of a preamble of a wireless LAN (that is, 802.11) frame. This method may stably detect the signal, but is disadvantageous in that the method operates only in an initial part of a frame where the preamble is present. According to an embodiment, the signal detection may be used in the CCA for a primary channel in a wideband wireless LAN. Next, the energy detection (CCA-ED) is a method that senses energy of all signals received with a specific threshold or more. This method may be used to sense a wireless signal in which the preamble is not normally sensed, for instance, signals such as Bluetooth, ZigBee, and the like. Further, the method may be used in the CCA for a secondary channel in which the signal is not continuously tracked. Meanwhile, the correlation detection (CCA-CD) as a method that may sense a signal level even in the middle of a wireless LAN frame uses that a wireless LAN signal has a periodic repetition pattern of orthogonal frequency division multiplex (OFDM) signal. That is, the correlation detection method receives wireless LAN data for a predetermined time and thereafter, detects signal strengths of the repetition patterns of an OFDM signal symbol.

According to the embodiment of the present invention, the access of the terminal to the channel may be controlled by using a predetermined CCA threshold for each CCA method. In the embodiment of FIG. 6, a CCA-ED threshold 10 represents a predetermined threshold in order to perform the energy detection and a CCA-SD threshold 30 represents a predetermined threshold in order to perform the signal detection. Further, receiving (RX) sensitivity 50 represents a minimum signal strength at which the terminal may decode the wireless signal. According to the embodiment, the RX sensitivity 50 may be set to a level which is the same as or lower than the CCA-SD threshold 30 according to a capability and a configuration of the terminal. Further, the CCA-ED threshold 10 may be set to a higher level than the CCA-SD threshold 30. For example, the CCA-ED threshold 10 and the CCA-SD threshold 30 may be set to −62 dBm and −82 dBm, respectively. However, the present invention is not limited thereto and the CCA-ED threshold 10 and the CCA-SD threshold 30 may be differently set according to whether the CCA-ED threshold 10 and the CCA-SD threshold 30 are thresholds for the primary channel, a bandwidth of a channel that performs the CCA, and the like.

According to the embodiment of FIG. 6, each terminal measures a received signal strength indicator (RX RSSI) of the received wireless signal and determines a channel state based on a comparison between the measured received signal strength and each set CCA threshold.

First, when a wireless signal 350 above the RX sensitivity 50, which is received in a specific channel has an RX RSSI of the CCA-SD threshold 30 or less, it is determined that the corresponding channel is idle. Therefore, the received signal is not processed or protected in the terminal and each terminal may attempt the access to the corresponding channel according to the method described in FIG. 5, and the like.

When a wireless LAN signal 330 having the RX RSSI of the CCA-SD threshold 30 or more is received in a specific channel, it is determined that the corresponding channel is in a busy state. Accordingly, the terminal that receives the corresponding signal delays the access to the channel. According to an embodiment, the terminal may determine whether the corresponding signal is the wireless LAN signal by using a signal pattern of a preamble part of the received wireless signal. According to the embodiment of FIG. 6, even in case that a wireless LAN signal of other BSS is received in addition to a wireless LAN signal of BSS which is the same with the corresponding terminal, each terminal determines that the channel is in the busy state.

Meanwhile, when a wireless signal 310 having the RX RSSI of the CCA-ED threshold 10 or more is received in a specific channel, it is determined that the corresponding channel is in the busy state. In case that another type of wireless signal (other than the wireless LAN signal) is received as well, the terminal determines that the corresponding channel is in the busy state, if the RX RSSI of the corresponding signal is the CCA-ED threshold 10 or more. Accordingly, the terminal that receives the corresponding signal delays the access to the channel.

Figure 7:
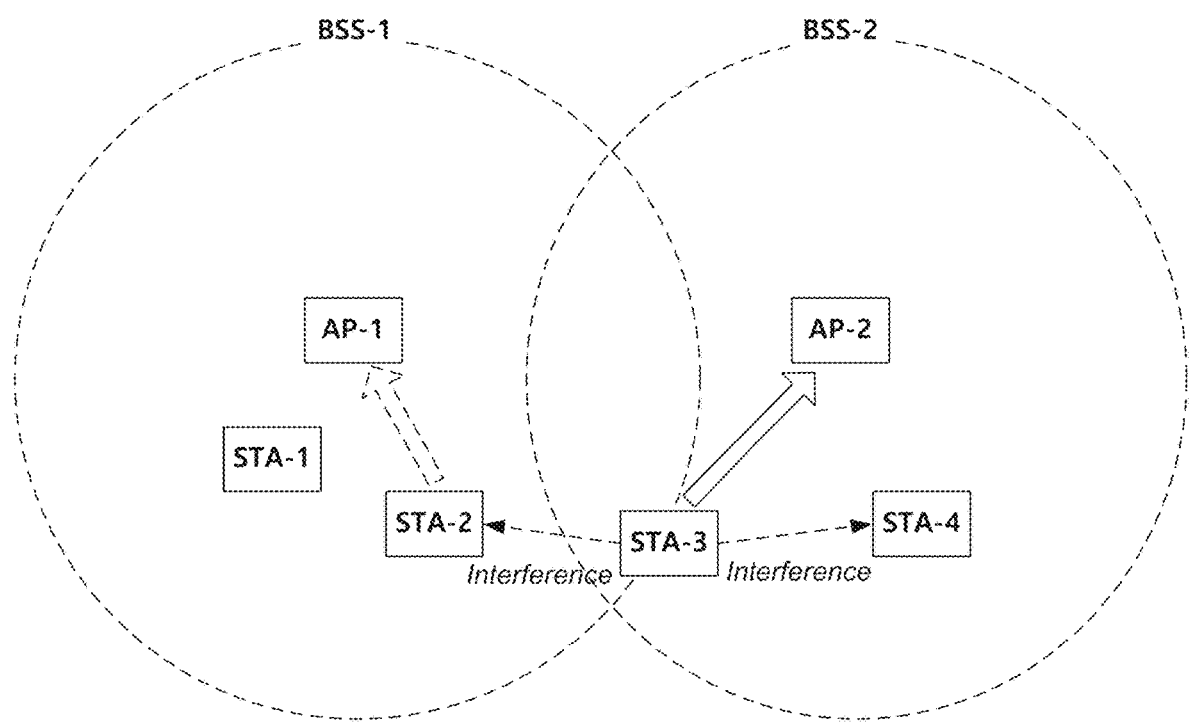
FIG. 7 is a diagram illustrating one example of an overlapped BSS environment.

FIG. 7 illustrates one example of an overlapping BSS (OBSS) environment. In FIG. 7, in BSS-1 operated by AP-1, station 1 (STA-1) and station 2 (STA-2) are associated with AP-1 and in BSS-2 operated by AP-2, station 3 (STA-3) and station 4 (STA-4) are associated with AP-2. In the overlapping BSS environment of FIG. 7, communication coverages of BSS-1 and BSS-2 at least partially overlap with each other.

As illustrated in FIG. 7, when STA-3 transmits upload data to AP-2, STA-3 may continuously interfere with STA-2 of BSS-1 positioned adjacent thereto. In this case, interference which occurs while BSS-1 and BSS-2 use the same frequency band (for example, 2.4 GHz, 5 GHz, or the like) and the same primary channel is referred to as co-channel interference (CCI). Further, interference which occurs while BSS-1 and BSS-2 use an adjacent primary channel is referred to as adjacent channel interference (ACI). The CCI or ACI may be received with a higher signal strength than the CCA threshold (e.g. CCA SD threshold) of STA-2 according to a distance between STA-2 and STA-3. When the interference is received by STA-2 with the higher strength than the CCA threshold, STA-2 recognizes that the corresponding channel is in the busy state to delay transmission of the upload data to AP-1. However, since STA-2 and STA-3 are stations that belong to different BSSs, when the CCA threshold of STA-2 increases, STA-2 and STA-3 may simultaneously upload to AP-1 and AP-2, respectively, thereby achieving an effect of spatial reuse.

Meanwhile, in FIG. 7, the transmission of the upload data by STA-3 in BSS-2 interferes even in STA-4 that belongs to the same BSS-2. In this case, when the CCA threshold of STA-4 increases similarly to STA-2, STA-3 and STA-4 that belong to the same BSS simultaneously transmit the upload data to AP-2, and as a result, a collision may occur. Therefore, in order to increase the CCA threshold for predetermined interference, it is needed to determine whether the corresponding interference is caused by signals that belong to the same BSS or signals that belong to different BSSs. To this end, each terminal needs to verify a BSS identifier of the received wireless LAN signal or other types of information to distinguish the BSS. Further, it is preferable that the BSS information is verified within a short time while the CCA process is performed.

FIGS. 8 to 13 are diagrams illustrating various embodiments of the CCA method according to the present invention. In the embodiments of FIGS. 8 to 13, an area marked with a shade indicates a wireless signal which is received but disregarded, that is, not protected by the terminal. In other words, when the wireless signal corresponding to the area marked with the shade is received, the terminal determines that the corresponding channel is in the idle state. Meanwhile, when a wireless signal corresponding to an area not marked with the shade is received, the terminal determines that the corresponding channel is in the busy state. In this case, the RX sensitivity may be set to the level which is the same as or lower than the CCA-SD threshold according to the capability and the configuration of the terminal. Further, the CCA-ED threshold may be set to the higher level than the CCA-SD threshold. Individual processes described in FIG. 5 may be performed based on a result of determining whether the channel is busy in each embodiment to be described below.

Figure 8:
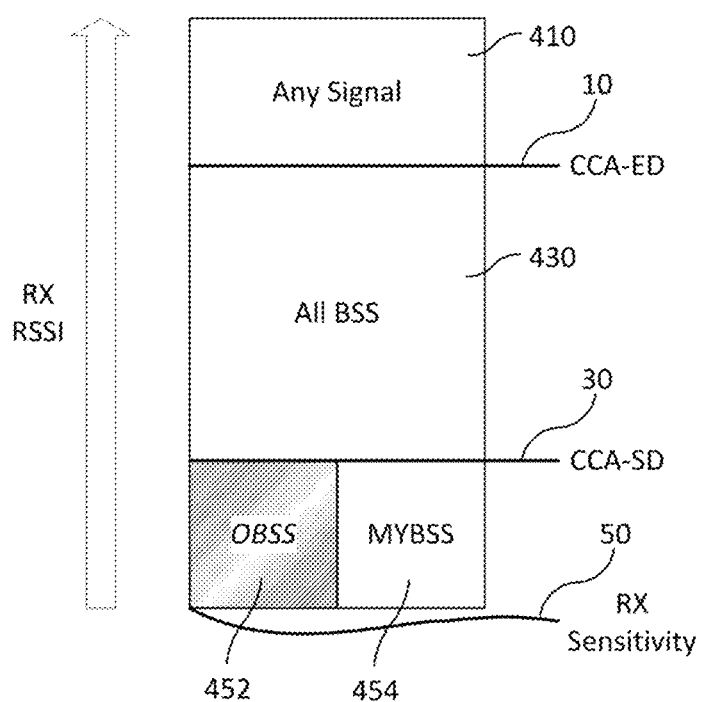
FIGS. 8 to 10 are diagrams illustrating various embodiments of a CCA method using BSS identifier information of a received wireless signal.
Figure 9:
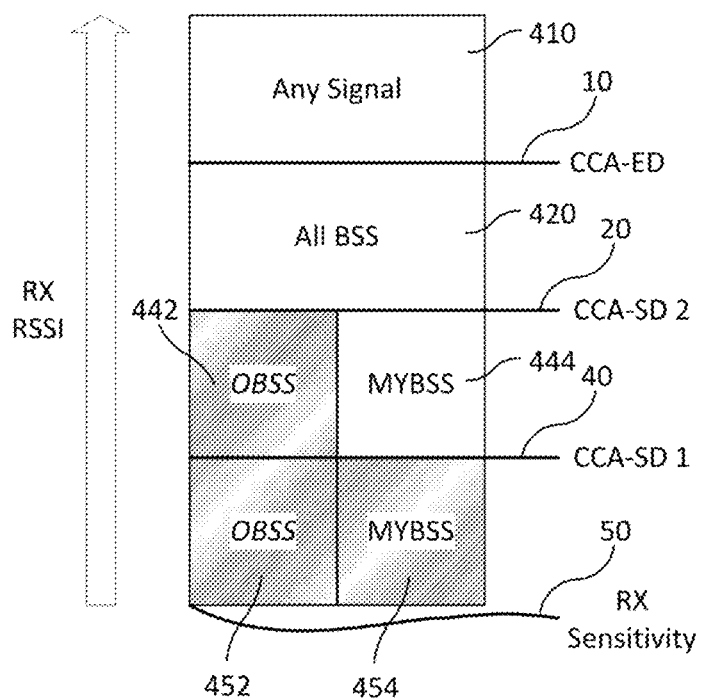
Figure 10:
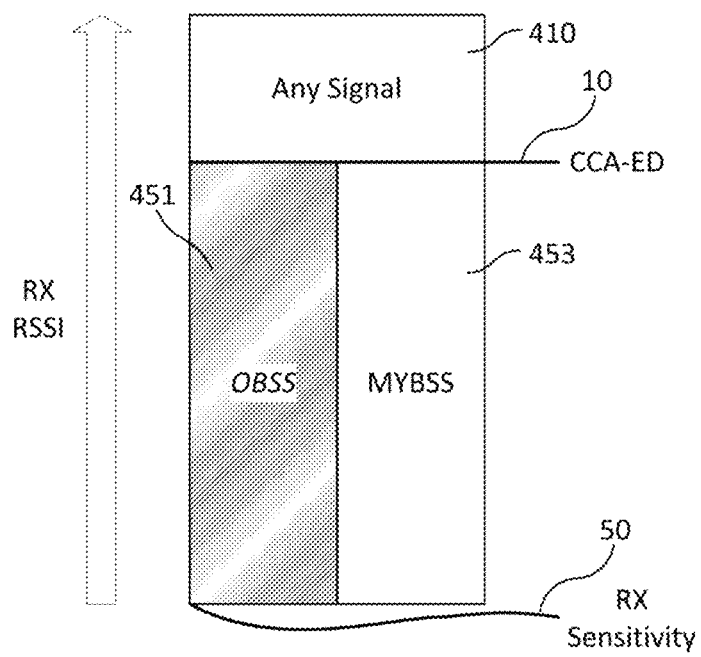

In each of the embodiments of FIGS. 8 to 10, the terminal may measure the RX RSSI of the received wireless signal and determine whether the corresponding signal is the wireless LAN signal. When the received signal is the wireless LAN signal having the BSS identifier information according to various embodiments to be described below, the terminal may extract the BSS identifier information from the corresponding signal and determine whether the extracted BSS identifier information is the same as the BSS identifier information of the corresponding terminal.

First, according to the embodiment of FIG. 8, the CCA threshold for the corresponding signal may be decided based on whether the received wireless signal is the wireless LAN signal having the BSS identifier information which is the same as the BSS identifier information of the terminal. In the embodiment of the present invention, the BSS identifier information of the terminal is BSS identifier information assigned to the corresponding terminal and may represent, when the corresponding terminal is a non-AP STA, BSS identifier information of an AP which the corresponding terminal is associated with or intends to be associated with. In this case, the terminal may receive the BSS identifier information from the AP and the received BSS identifier information may be stored in the corresponding terminal.

Referring to FIG. 8, when a received wireless signal of a specific channel is the wireless LAN signal having an RX RSSI of the RX sensitivity 50 or more and the CCA-SD threshold 30 or less, whether the channel is busy is determined based on whether the corresponding signal is the wireless LAN signal having the same BSS identifier information as that of the terminal. When the BSS identifier information extracted from the wireless signal is different from the BSS identifier information of the terminal (that is, in the case of OBSS wireless LAN signal 452), it is determined that the corresponding channel is in the idle state. However, when the BSS identifier information extracted from the wireless signal is the same as the BSS identifier information of the terminal (that is, in the case of MYBSS wireless LAN signal 454), it is determined that the corresponding channel is in the busy state.

Meanwhile, when the received wireless signal of the specific channel is a wireless LAN signal 430 having the RX RSSI between the CCA-SD threshold 30 and the CCA-ED threshold 10, it is determined that the corresponding channel is in the busy state. In this case, even in the case where the corresponding signal is a wireless LAN signal having different BSS identifier information from that of the terminal in addition to the case where the corresponding signal is the wireless LAN signal having the same BSS identifier information as that of the terminal, the terminal that receives the wireless LAN signal 430 determines that the channel where the corresponding signal is received is in the busy state.

During the energy detection process, when the wireless signal of the specific channel, which is received by the terminal is a wireless signal 410 having the RX RSSI of the CCA-ED threshold 10 or more, it is determined that the corresponding channel is in the busy state. As described above, in case that another type of wireless signal (other than the wireless LAN signal) is received as well, the terminal determines that the corresponding channel is in the busy state, if the RX RSSI of the wireless signal is the CCA-ED threshold 10 or more.

As such, according to the embodiment of FIG. 8, the CCA threshold applied to the wireless LAN signal having the same BSS identifier information as that of the terminal may have a different level from the CCA threshold applied to the wireless LAN signal having the different BSS identifier information from that of the terminal. According to an embodiment, the CCA threshold applied to the wireless LAN signal having the different BSS identifier information from that of the terminal is set to a higher level than the CCA threshold applied to the wireless LAN signal having the same BSS identifier information as that of the terminal. According to the embodiment of FIG. 8, as the CCA threshold for the wireless LAN signal having the different BSS identifier information from that of the terminal, the predetermined CCA-SD threshold 30 may be adopted and as the CCA threshold for the wireless LAN signal having the same BSS identifier information as that of the terminal, the level of the RX sensitivity 50 of the terminal may be adopted.

FIGS. 9 and 10 illustrate another embodiment of the CCA method using the BSS identifier information. In the embodiments of FIGS. 9 and 10, duplicative description of parts, which are the same as or correspond to the embodiment of FIG. 8, will be omitted.

First, according to the embodiment of FIG. 9, the CCA threshold for the corresponding signal may be decided based on whether the received wireless signal is the wireless LAN signal having the BSS identifier information which is the same as the BSS identifier information of the terminal.

Referring to FIG. 9, when the RX RSSI of a received wireless signal of a specific channel is the RX sensitivity 50 or more and a first CCA-SD threshold 40 or less, it is determined that the corresponding channel is in the idle state. In this case, both in the case where the received signal is a wireless LAN signal 454 having the same BSS identifier information as that of the terminal and in the case where the received signal is a wireless LAN signal 452 having the different BSS identifier information from that of the terminal, the terminal determines that the channel where the corresponding signal is received is in the idle state.

However, when the received wireless signal of the specific channel is the wireless LAN signal having the RX RSSI between the first CCA-SD threshold 40 and a second CCA-SD threshold 20, whether the channel is busy is determined based on whether the corresponding signal is the wireless LAN signal having the same BSS identifier information as that of the terminal. When the BSS identifier information extracted from the wireless signal is different from the BSS identifier information of the terminal (that is, in the case of OBSS wireless LAN signal 442), it is determined that the corresponding channel is in the idle state. However, when the BSS identifier information extracted from the wireless signal is the same as the BSS identifier information of the terminal (that is, in the case of MYBSS wireless LAN signal 444), it is determined that the corresponding channel is in the busy state. In the embodiment of FIG. 9, the second CCA-SD threshold 20 which is used to perform the signal detection for the wireless LAN signal having the different BSS identifier information from that of the terminal may be set to a level which is larger than the first CCA-SD threshold 40 and equal to or smaller than the CCA-ED threshold.

Meanwhile, when the received wireless signal of the specific channel is a wireless LAN signal 420 having an RX RSSI between the second CCA-SD threshold 20 and the CCA-ED threshold 10, it is determined that the corresponding channel is in the busy state. In this case, even in the case where the corresponding signal is a wireless LAN signal having different BSS identifier information from that of the terminal in addition to the case where the corresponding signal is the wireless LAN signal having the same BSS identifier information as that of the terminal, the terminal that receives the wireless LAN signal 420 determines that the channel where the corresponding signal is received is in the busy state.

During the energy detection process, when the received wireless signal of the specific channel by the terminal is a wireless signal 410 having the RX RSSI of the CCA-ED threshold 10 or more, it is determined that the corresponding channel is in the busy state. As described above, in case that another type of wireless signal (other than the wireless LAN signal) is received as well, the terminal determines that the corresponding channel is in the busy state, if the RX RSSI of the wireless signal is the CCA-ED threshold 10 or more.

As such, according to the embodiment of FIG. 9, the CCA threshold applied to the wireless LAN signal having the same BSS identifier information as that of the terminal may have a different level from the CCA threshold applied to the wireless LAN signal having the different BSS identifier information from that of the terminal. That is, as the CCA threshold for the wireless LAN signal having the same BSS identifier information as that of the terminal, the predetermined first CCA-SD threshold 40 may be adopted and as the CCA threshold for the wireless LAN signal having the different BSS identifier information from that of the terminal, the predetermined second CCA-SD threshold 20 may be adopted. Herein, the second CCA-SD threshold 20 may be set to a level which is higher than the first CCA-SD threshold 40 and equal to or lower than the CCA-ED threshold.

Next, according to the embodiment of FIG. 10, when the RX RSSI of a received wireless signal of a specific channel is the RX sensitivity 50 or more, the signal detection may be performed based on whether the corresponding signal is the wireless LAN signal having the same BSS identifier information as that of the terminal.

During the signal detection process, when the RX RSSI of the wireless signal received by the terminal is the RX sensitivity 50 or more and the wireless signal is a wireless LAN signal 453 having the same BSS identifier information as that of the terminal, it is determined that the corresponding channel is in the busy state. However, when the RX RSSI of the received wireless signal is the RX sensitivity 50 or more and the wireless signal is a wireless LAN signal 451 having different BSS identifier information from that of the terminal, it is determined that the corresponding channel is in the idle state.

Meanwhile, during the energy detection process, when the wireless signal received by the terminal is the wireless signal 410 having the RX RSSI of the CCA-ED threshold 10 or more, it is determined that the corresponding channel is in the busy state. The terminal determines that the corresponding channel is in the busy state regardless of whether the corresponding signal is the wireless LAN signal having the same BSS identifier information as that of the terminal and furthermore, regardless of whether the corresponding signal is the wireless LAN signal. Therefore, when the wireless LAN signal having the different BSS identifier information from that of the terminal is received at a level higher than the CCA-ED threshold 10, it is determined that the corresponding channel is in the busy state by the energy detection process.

As such, according to the embodiment of FIG. 10, the terminal may determine whether the channel is busy based on whether the received wireless signal is the wireless LAN signal having the same BSS identifier information as that of the terminal without using a separately set CCA-SD threshold during the signal detection process. However, the terminal may avoid a collision with the wireless LAN signal having the different BSS identifier information from that of the terminal by using the predetermined CCA-ED threshold 10 for the energy detection.

Figure 11:
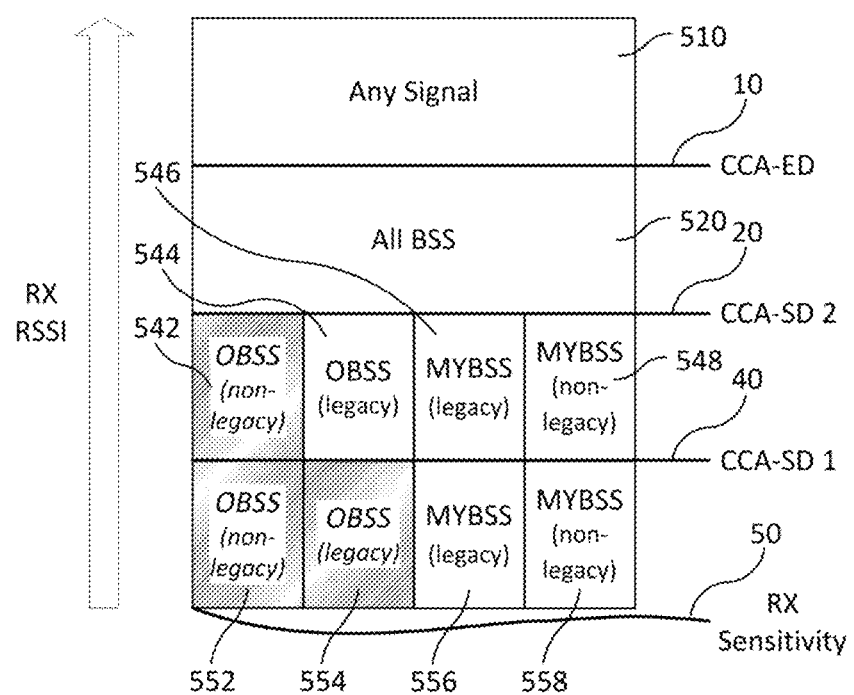
FIGS. 11 to 13 are diagrams illustrating another embodiment of a CCA method using whether to obtain non-legacy wireless LAN information from a received wireless signal and BSS identifier information.
Figure 12:
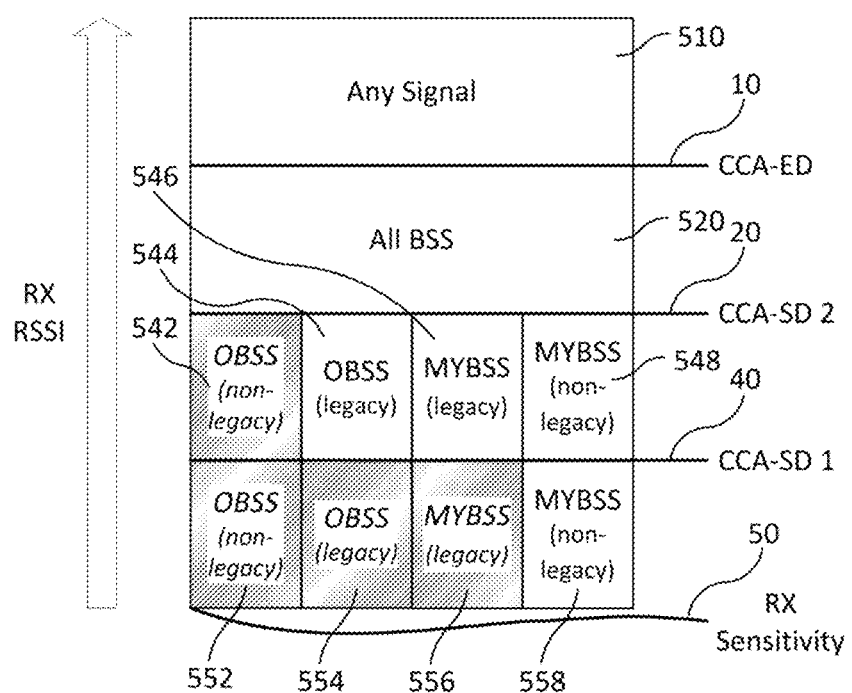
Figure 13:
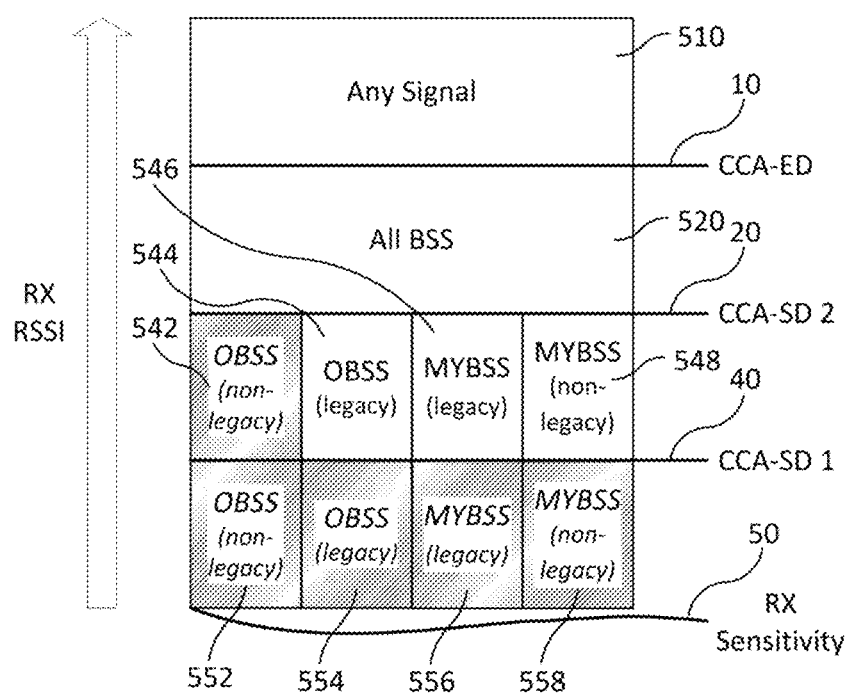

FIGS. 11 to 13 are diagrams illustrating yet another embodiment of a CCA method using whether to obtain non-legacy wireless LAN information and BSS identifier information. In each embodiment of FIGS. 11 to 13, the terminal may measure the RX RSSI of the received wireless signal and determine whether the corresponding signal is the wireless LAN signal. When the received signal is the wireless LAN signal having the BSS identifier information according to various embodiments to be described below, the terminal may extract the BSS identifier information from the corresponding signal and determine whether the extracted BSS identifier information is the same as the BSS identifier information of the corresponding terminal.

Moreover, the terminal may obtain at least one of the legacy wireless LAN information and the non-legacy wireless LAN information from the received wireless signal. As a result, the terminal may determine whether the received wireless signal is a signal including only the legacy wireless LAN information or a signal including both the legacy wireless LAN information and the non-legacy wireless LAN information. According to an embodiment, the terminal may obtain at least one of the legacy wireless LAN information and the non-legacy wireless LAN information by using preamble information of the received wireless signal. The BSS identifier information of the wireless signal may be extracted from the non-legacy wireless LAN information when the non-legacy wireless LAN information is obtained from the corresponding signal. However, the present invention is not limited thereto and according to various embodiments described below the BSS identifier information of the wireless signal may be also extracted from the legacy wireless LAN information. According to an embodiment of the present invention, the BSS identifier information which is referred to for executing the CCA is included in the non-legacy wireless LAN information, while the non-legacy wireless LAN information may not be included in the received wireless signal. That is, when the received wireless signal does not include the BSS identifier information which is referred to for executing the CCA according to the embodiment of the present invention, the BSS identifier information may not be extracted from the corresponding signal. In this case, the BSS identifier information of the corresponding signal for executing the CCA may be set to a predetermined value. In the embodiments of FIGS. 11 to 13, duplicative description of parts, which are the same as or correspond to the aforementioned embodiments, will be omitted.

First, referring to FIG. 11, when a received wireless signal of a specific channel is the wireless LAN signal having the RX RSSI of the RX sensitivity 50 or more and the first CCA-SD threshold 40 or less, whether the channel is busy is determined based on whether the corresponding signal is the wireless LAN signal having the same BSS identifier information as that of the terminal.

When the BSS identifier information extracted from the wireless signal is different from the BSS identifier information of the terminal (that is, in the case of OBSS wireless LAN signal), it is determined that the corresponding channel is in the idle state. In this case, the OBSS wireless LAN signal 552 may be divided into an OBSS non-legacy wireless LAN signal in which the non-legacy wireless LAN information may be obtained from the corresponding signal and an OBSS legacy wireless LAN signal in which the non-legacy wireless LAN information is not obtained from the corresponding signal. The terminal determines that the corresponding channel is in the idle state both in the case where the OBSS non-legacy wireless LAN signal is received and in the case where the OBSS legacy wireless LAN signal is received.

On the contrary, when the BSS identifier information extracted from the wireless signal is the same as the BSS identifier information of the terminal (that is, in the case of MYBSS wireless LAN signal), it is determined that the corresponding channel is in the busy state. Similarly, the MYBSS wireless signal may be divided into a MYBSS non-legacy wireless LAN signal 558 in which the non-legacy wireless LAN information may be obtained from the corresponding signal and an MYBSS legacy wireless LAN signal 556 in which the non-legacy wireless LAN information is not obtained from the corresponding signal. The terminal determines that the corresponding channel is in the busy state both in the case where the MYBSS non-legacy wireless LAN signal 558 is received and in the case where the MYBSS legacy wireless LAN signal 556 is received.

Meanwhile, when the received wireless signal of the specific channel is the wireless LAN signal having the RX RSSI between the first CCA-SD threshold 40 and the second CCA-SD threshold 20, whether the channel is busy is determined based on whether the corresponding signal includes the non-legacy wireless LAN information and whether the corresponding signal has the same BSS identifier information as that of the terminal. According to an embodiment, the first CCA-SD threshold 40 may be set to the same level as the CCA-SD threshold applied to the legacy terminal and the second CCA-SD threshold 20 may be set to a higher level than the first CCA-SD threshold 40 and equal to or lower than the CCA-ED threshold.

When the non-legacy wireless LAN information is obtained from the wireless signal and the BSS identifier information of the corresponding signal is different from the BSS identifier information of the terminal (that is, in the case of non-legacy OBSS signal 542), it is determined that the corresponding channel is in the idle state. However, in other cases, when the non-legacy wireless LAN information is not obtained from the wireless signal (that is, a legacy signal) or the BSS identifier information of the corresponding signal is the same as the BSS identifier information of the terminal (that is, a MYBSS signal), it is determined that the corresponding channel is in the busy state. In more detail, the case where it is determined that the channel is in the busy state includes i) a case where the non-legacy wireless LAN information is not obtained from the wireless signal and the BSS identifier information of the corresponding signal is different from the BSS identifier information of the terminal (that is, in the case of legacy OBSS signal 544), ii) a case where the non-legacy wireless LAN information is not obtained from the wireless signal and the BSS identifier information of the corresponding signal is the same as the BSS identifier information of the terminal (that is, in the case of legacy MYBSS signal 546), and iii) a case where the non-legacy wireless LAN information is obtained from the wireless signal and the BSS identifier information of the corresponding signal is the same as the BSS identifier information of the terminal (that is, in the case of non-legacy MYBSS signal 548).

That is, when the non-legacy wireless LAN information is not obtained from the wireless signal, it is determined that the corresponding channel is in the busy state, but when the non-legacy wireless LAN information is obtained from the wireless signal, whether the channel is busy is determined based on whether the BSS identifier information of the corresponding signal is the same as the BSS identifier information of the terminal. Therefore, according to the embodiment of the present invention, when the non-legacy wireless LAN information is obtained from the wireless signal, whether the corresponding channel is busy may be determined based on the BSS identifier information of the wireless signal. According to an embodiment, when the non-legacy wireless LAN information is not obtained from the wireless signal, the BSS identifier information which is referred to for executing the CCA of the present invention may not be extracted from the corresponding signal. In this case, the terminal may determine that the channel is in the busy state regardless of whether the BSS identifier information is extracted from the corresponding signal.

The signal detection process may be performed by referring to the preamble of the received wireless signal. According to an embodiment, when it is determined that the channel is in the busy state during the signal detection process, even though the RX RSSI decreases to the first CCA-SD threshold 40 or less while receiving the wireless signal which is being protected, the terminal may not access the channel during a frame transmission time of the wireless signal.

Meanwhile, when the received wireless signal of the specific channel is a wireless LAN signal 520 between the second CCA-SD threshold 20 and the CCA-ED threshold 10, it is determined that the corresponding channel is in the busy state. In this case, the terminal that receives the wireless LAN signal 520 determines that a channel where the corresponding signal is received is in the busy state regardless of whether the non-legacy wireless LAN information is obtained from the corresponding signal and furthermore, regardless of whether the corresponding signal is the wireless LAN signal having the same BSS identifier information as that of the terminal.

During the energy detection process, when the received wireless signal of the specific channel by the terminal is a wireless signal 510 of the CCA-ED threshold 10 or more, it is determined that the corresponding channel is in the busy state. As described above, in case that another type of wireless signal (other than the wireless LAN signal) is received as well, the terminal determines that the corresponding channel is in the busy state, if the RX RSSI of the wireless signal is the CCA-ED threshold 10 or more.

Next, according to the embodiment of FIG. 12, when a received wireless signal of a specific channel is the wireless LAN signal having the RX sensitivity 50 or more and the RX RSSI of the first CCA-SD threshold 40 or less, whether the channel is busy is determined based on whether the corresponding signal includes the non-legacy wireless LAN information and whether the corresponding signal has the same BSS identifier information as that of the terminal.

When the non-legacy wireless LAN information is obtained from the wireless signal and the BSS identifier information of the corresponding signal is the same as the BSS identifier information of the terminal (that is, in the case of non-legacy MYBSS signal 558), it is determined that the corresponding channel is in the busy state. However, in other cases, when the BSS identifier information of the wireless signal is different from the BSS identifier information of the terminal (that is, OB SS signal) or the non-legacy wireless LAN information is not obtained from the corresponding signal (that is, legacy signal), it is determined that the corresponding channel is in the idle state. In more detail, the case where it is determined that the channel is in the idle state includes i) a case where the non-legacy wireless LAN information is obtained from the wireless signal and the BSS identifier information of the corresponding signal is different from the BSS identifier information of the terminal (that is, in the case of non-legacy OBSS signal 552), ii) a case where the non-legacy wireless LAN information is not obtained from the wireless signal and the BSS identifier information of the corresponding signal is different from the BSS identifier information of the terminal (that is, in the case of legacy BSS signal 554), and iii) a case where the non-legacy wireless LAN information is not obtained from the wireless signal and the BSS identifier information of the corresponding signal is the same as the BSS identifier information of the terminal (that is, in the case of legacy MYBSS signal 556).

That is, when the non-legacy wireless LAN information is not obtained from the wireless signal, it is determined that the corresponding channel is in the idle state, but when the non-legacy wireless LAN information is obtained from the wireless signal, whether the channel is busy is determined based on whether the BSS identifier information of the corresponding signal is the same as the BSS identifier information of the terminal. According to the embodiment of FIG. 12, when the non-legacy wireless LAN information is obtained from the wireless signal and the BSS identifier information of the corresponding signal is different from the BSS identifier information of the terminal, a predetermined CCA threshold 20 may be used for the CCA of the corresponding channel. However, when the non-legacy wireless LAN information is obtained from the wireless signal and the BSS identifier information of the corresponding signal is the same as the BSS identifier information of the terminal, in the case where the corresponding signal has the RX RSSI of the RX sensitivity 50 or more, it may be determined that the corresponding channel is in the busy state without setting a separate CCA threshold. According to an embodiment, when the non-legacy wireless LAN information is not obtained from the wireless signal, the BSS identifier information which is referred to for executing the CCA of the present invention may not be extracted from the corresponding signal. In this case, the terminal may determine that the channel is in the idle state regardless of whether the BSS identifier information is extracted from the corresponding signal.

According to the embodiment of FIG. 12, even though the BSS identifier information which is referred to for executing the CCA is included in the non-legacy wireless LAN information and the received wireless LAN signal does not include the non-legacy wireless LAN information, the CCA may be efficiently executed. That is, when the received wireless signal is the legacy wireless LAN signal from which the BSS identifier information is not extracted, it is determined that the corresponding channel is in the idle state or the busy state in a lump according to the RX RSSI of the corresponding signal to minimize a time delay required to determine whether the BSS identifier of the legacy wireless LAN signal is actually the same as the BSS identifier of the terminal. That is, only when the received wireless signal is the non-legacy wireless LAN signal, the terminal additionally verifies the BSS identifier information to determine whether the channel is in the idle/busy state.

Next, according to the embodiment of FIG. 13, when the RX RSSI of a received wireless signal of a specific channel is the RX sensitivity 50 or more and the first CCA-SD threshold 40 or less, it is determined that the corresponding channel is in the idle state. In this case, the terminal determines that the corresponding channel is in the idle state regardless of whether the received signal includes the non-legacy wireless LAN information and whether the received signal has the same BSS identifier information as that of the terminal. Further, according to the embodiment of FIG. 13, when the non-legacy wireless LAN information is obtained from the wireless signal and the BSS identifier information of the corresponding signal is the same as the BSS identifier information of the terminal, a first CCA threshold may be used for the CCA of the corresponding channel. However, when the non-legacy wireless LAN information is obtained from the wireless signal and the BSS identifier information of the corresponding signal is different from the BSS identifier information of the terminal, a second CCA threshold having a higher level than the first CCA threshold may be used for the CCA of the corresponding channel.

According to the embodiment of FIG. 13, when the wireless LAN signal having the same BSS identifier information as that of the terminal is received, a problem of unfairness in that different CCA thresholds are applied according to whether the corresponding wireless LAN signal includes the non-legacy wireless LAN information may be resolved. That is, CCA thresholds for the legacy MYBSS signal and the non-legacy MYBSS signal are similarly applied to maintain fairness for channel occupation between a legacy terminal and a non-legacy terminal.

Meanwhile, in the embodiments of FIGS. 12 and 13, when the wireless signal having the RX RSSI of the first CCA-SD threshold 40 or more is received, a CCA process may be performed similarly to the embodiment of FIG. 11.

Figure 14:
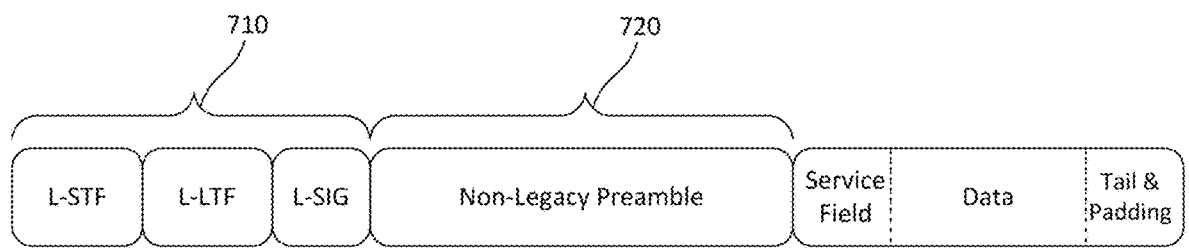
FIG. 14 is a diagram illustrating a frame structure of a wireless LAN signal according to an embodiment of the present invention.

FIG. 14 is a diagram illustrating a frame structure of a wireless LAN signal according to an embodiment of the present invention. Referring to FIG. 14, the wireless LAN signal according to the embodiment of the present invention may include a legacy preamble 710 for a legacy terminal (e.g. a terminal such as 802.11a/g, or the like) and a non-legacy preamble 720 for a non-legacy terminal (e.g. a terminal of 802.11ax). First, the legacy preamble 710 may include legacy wireless LAN information which the legacy terminal is able to decode, for instance, L-STF, L-LTF, L-SIG fields, and the like. Next, the non-legacy preamble 720 may include non-legacy wireless LAN information which only the non-legacy terminal is able to decode and the non-legacy wireless LAN information may not be decoded by the legacy terminal. Meanwhile, the legacy preamble 710 may include at least some of the non-legacy wireless LAN information which the non-legacy terminal is able to decode according to the embodiment. Moreover, the non-legacy preamble 720 may include at least one field of the legacy preamble 710, for instance, repeated information of a part or the entirety of the L-SIG field.

According to an embodiment of the present invention, the BSS identifier information which is referred to for executing the CCA may be included in the non-legacy preamble 720 as the non-legacy wireless LAN information. In this case, the BSS identifier information may be extracted from a predetermined bit filed of the non-legacy preamble 720. Meanwhile, according to another embodiment of the present invention, the BSS identifier information may be extracted from additional information of the legacy preamble 710. For example, the legacy preamble 710 may include the non-legacy wireless LAN information through an additional subcarrier set, and the like as described below and the BSS identifier information may be obtained from the non-legacy wireless LAN information included in the legacy preamble 710. According to yet another embodiment of the present invention, the BSS identifier information may be extracted from a predetermined bit field of the legacy preamble 710. In this case, the predetermined bit field of the legacy preamble 710 may be a bit field set for the legacy terminal and a value of the corresponding bit field may be used as the BSS identifier information under a specific condition as described below.

FIG. 15 illustrates a method for representing the BSS identifier information according to an embodiment of the present invention. According to the embodiment of the present invention, the BSS identifier information may be represented as a predetermined bit filed of the non-legacy preamble 720 of FIG. 14. According to an embodiment of the present invention, the BSS identifier information may be abbreviated information of a BSS identifier assigned to each BSS and may be information having smaller bits than the actual BSS identifier. For example, when the BSS identifier is represented as information of 24 bits in a specific wireless LAN system, the BSS identifier information may be represented as a bit filed having a predetermined length in the range of 1 bit to 23 bits. In the preset invention, the BSS identifier information is information acquired by classifying the actual BSS identifier into a predetermined category and may be named even as a BSS color. A method for obtaining a BSS color abbreviated from the BSS identifier includes a method using a combination of bit values at a predetermined location of the BSS identifier, a method using a result value acquired by applying a predetermined Hash function to the BSS identifier, and the like.

FIG. 15 as an embodiment thereof illustrates a result of acquiring the BSS color by using last 3 bit values of the BSS identifier. As such, the BSS color may be included in the preamble of the wireless LAN signal as information of a smaller amount than the actual BSS identifier, and as a result, each terminal may efficiently determine whether the received wireless LAN signal is a signal having the same BSS identifier as the corresponding terminal within a short time. The BSS identifier information may be represented as a predetermined bit of the non-legacy preamble.

Meanwhile, according to an embodiment of the present invention, the non-legacy preamble 720 may include the repeated L-SIG field and the repeated L-SIG field may be configured to have at least the some bits identical with the L-SIG field of the legacy preamble 710. In this case, the bits different from the L-SIG field of the legacy preamble 710 among the bits of the repeated L-SIG field may represent the BSS identifier information, bandwidth information of the system, non-legacy wireless LAN system information, channel information, and the like.

According to an additional embodiment of the present invention, additional information may be transmitted through a modulation method applied to the repeated L-SIG field. That is, the repeated L-SIG field may be represented as the same modulation value as the L-SIG field of the legacy preamble 710 or otherwise expressed as a counter modulation value. Herein, the counter modulation value may be represented through a phase shift between modulation symbols transmitted to the L-SIG of the legacy preamble 710 and modulation symbols of the repeated L-SIG and the additional information may be transmitted through a phase shift amount. In detail, when the L-SIG of the legacy preamble 710 and the repeated L-SIG are multiplied by (1, 1) to be transmitted, the symbols of both fields have the same phase and when the L-SIG of the legacy preamble 710 and the repeated L-SIG are multiplied by (1, −1) to be transmitted, a phase shift of 180° occurs between the symbols of the repeated L-SIG and the symbols of the legacy preamble 710. In this case, specific flag information for the non-legacy wireless LAN information may be determined according to whether the repeated L-SIG field is represented as the same modulation value as the L-SIG field of the legacy preamble 710, for example, whether a SIG-A field of the non-legacy preamble has a variable length, whether a SIG-B field is included in the non-legacy preamble, whether a specific bit field of the non-legacy preamble (alternatively, legacy preamble) represents the BSS identifier information, and the like may be determined.

Figure 16:
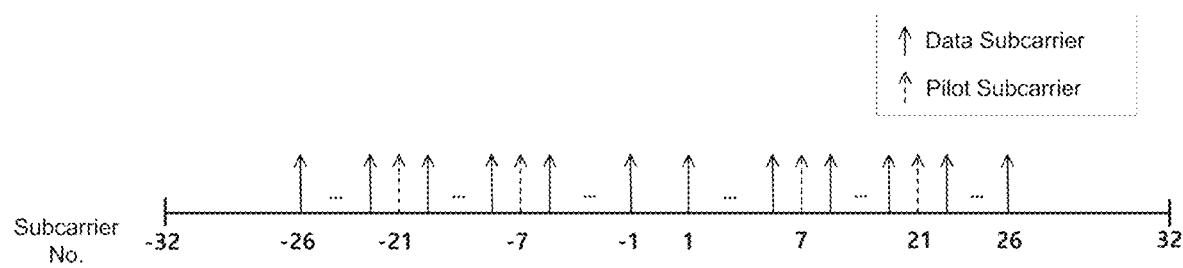
FIG. 16 is a diagram illustrating an embodiment of a subcarrier configuration used in a legacy preamble of a wireless LAN signal.
Figure 17:
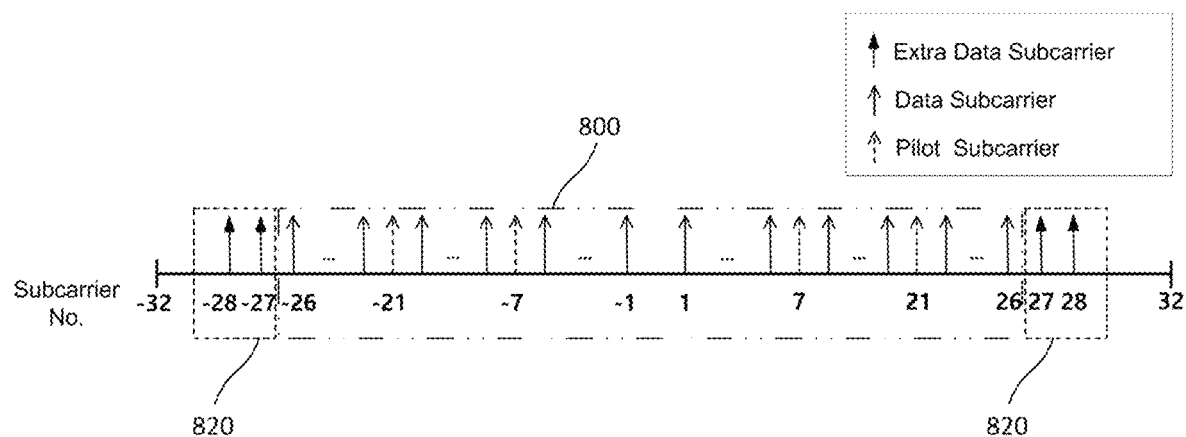
FIG. 17 is a diagram illustrating an embodiment of a subcarrier configuration used in a non-legacy wireless LAN signal.

FIGS. 16 and 17 as another embodiment of the present invention illustrate a method for obtaining the non-legacy wireless LAN information by using an additional subcarrier set of the wireless LAN signal.

First, FIG. 16 illustrates an embodiment of a subcarrier configuration used in the legacy preamble of the wireless LAN signal. According to an embodiment of the present invention, the subcarrier set of the legacy preamble of the non-legacy wireless LAN signal may be configured equivalent to the subcarrier set of the legacy wireless LAN signal. That is, the subcarrier set of the legacy preamble may be constituted by a total of 52 subcarrier including 4 pilot subcarriers and 48 data subcarriers in a bandwidth of 20 MHz. In this case, when numbers of respective subcarriers are set to −26, −25, . . . , −2, −1, 1, 2, . . . , 25, and 26, subcarriers having numbers of −21, −7, 7, and 21 are used as the pilot subcarriers and subcarriers of the residual numbers are used as the data subcarriers. Such a basic configuration of the subcarrier is required to maintain mutual compatibility in an environment in which the legacy wireless LAN system (e.g. 802.11 a/g) and the non-legacy wireless LAN system (e.g. 802.11 ax, or the like) coexist. That is, the legacy preamble of the non-legacy wireless LAN signal as well as the legacy wireless LAN signal has the subcarrier configuration illustrated in FIG. 16 to provide backward compatibility to the legacy terminal.

FIG. 17 illustrates an embodiment of the subcarrier configuration used in the non-legacy wireless LAN signal. An additional subcarrier may be used without interference of an adjacent bandwidth in the non-legacy wireless LAN system with the development of a filter or an amplifier used in the terminal. Referring to FIG. 17, the subcarrier of the non-legacy wireless LAN signal according to the embodiment of the present invention may be configured to include a first subcarrier set 800 and a second subcarrier set 820. In more detail, the first subcarrier set 800 may be configured equivalent to the subcarrier set of the legacy wireless LAN signal illustrated in FIG. 16. Further, the second subcarrier set 820 as a subcarrier set different from the first subcarrier set 800 may include 4 extra subcarriers, two at each higher and lower indices of the first subcarrier set 800, according to an embodiment. According to the embodiment of FIG. 17, since the non-legacy wireless LAN signal uses pilot subcarriers at the same location and of the same number as the legacy wireless LAN signal, 52 data subcarriers which increase from the existing 48 subcarriers by 4 may be used. According to an embodiment, the subcarrier configuration may be used after a legacy preamble part of the non-legacy wireless LAN signal. The non-legacy terminal may obtain information through a total of 56 subcarriers in the respective non-legacy preamble and data field of the received non-legacy wireless LAN signal.

According to the embodiment of the present invention, the second subcarrier set 820 included in the non-legacy preamble may represent the BSS identifier information, the bandwidth information of the system, the non-legacy wireless LAN system information, the channel information, and the like. In this case, a separate parity bit for parity check of the second subcarrier set 820 may be included in the non-legacy preamble. According to an embodiment, when the non-legacy preamble includes the repeated L-SIG field as described above, the BSS identifier information, the bandwidth information of the system, the non-legacy wireless LAN system information, the channel information, and the like may be represented through the second subcarrier set 820 of the repeated L-SIG field.

Meanwhile, according to another embodiment of the present invention, the subcarrier configuration of FIG. 17 may be extensively applied to the legacy preamble of the non-legacy wireless LAN signal. That is, the legacy preamble of the non-legacy wireless LAN signal may additionally include the second subcarrier set 820 and transfer the non-legacy wireless LAN information through the second subcarrier set 820. In this case, the legacy terminal may not obtain information from the second subcarrier set 820, but the non-legacy terminal may obtain additional information from the second subcarrier set 820 of the legacy preamble.

For example, when it is assumed that the second subcarrier set 820 additionally used in the legacy preamble includes 4 subcarriers, the indices (that is, subcarrier numbers) of the corresponding subcarriers may be set to −28, −27, 27, and 28, respectively as illustrated in FIG. 17. In this case, when a BPSK modulation scheme is used in the legacy preamble and the same modulation scheme is applied to the second subcarrier set, information of a total of 4 bits may be additionally transmitted. Similarly, when a QPSK modulation scheme is applied to the second subcarrier set, information of a total of 8 bits may be additionally transmitted. In this case, the parity bit for parity check of the second subcarrier set included in the legacy preamble may be included in the non-legacy preamble.

According to an additional embodiment of the present invention, only some of total bits which may be represented by the second subcarrier set 820 of the legacy preamble may be used for transmitting the additional information. For example, only some bits of the second subcarrier set 820 may be used for transmitting the additional information for compatibility with the parity check of the legacy preamble. That is, the information added to the second subcarrier set 820 may be configured to have even parities for compatibility with the parity bit used in the existing L-SIG and when the BPSK modulation scheme is used, information which may be transferred through the second subcarrier set 820 may be information of a total of 3 bits such as 1010, 0101, 1100, 0011, 1001, 0110, 1111, and 0000.

According to another embodiment, a specific bit of the second subcarrier set 820 may be used as the parity check bit and the residual bits may be used for transmitting the additional information. For example, 3 bits among 4 bits of the second subcarrier set 820 may be used for transmitting the additional information and 1 bit may be used as the parity bit. In this case, the parity bit of the second subcarrier set 820 may be used for the parity check for bits added by the second subcarrier set 820 or otherwise used for parity check of the entire L-SIG including the second subcarrier set 820. In this case, the parity check with respect to the legacy wireless LAN signal may be performed by using the existing parity bit of the L-SIG and the parity check with respect to the non-legacy wireless LAN signal is performed by using both the existing parity bit of the L-SIG and the parity bit of the second subcarrier set 820 to achieve parity check with higher-reliability. According to yet another embodiment, the parity check with respect to the non-legacy wireless LAN information added by the second subcarrier set 820 may be performed by using a reserved bit of the L-SIG.

When the additional information for the non-legacy terminal is transmitted through the second subcarrier set 820 of the legacy preamble, the non-legacy terminal may more rapidly obtain the additional information in the legacy preamble of the received wireless LAN signal, thus an initial access delay or detection of a preamble, a header, and a packet which are not required may be reduced by using the obtained additional information. Further, according to the embodiment of the present invention, the non-legacy terminal may obtain the non-legacy wireless LAN information from the second subcarrier set 820 of the legacy preamble and the non-legacy wireless LAN information obtained in that case may include the BSS identifier information, the bandwidth information of the system, the non-legacy wireless LAN system information, the channel information, and the like. When the non-legacy terminal obtains the second subcarrier set 820 in the legacy preamble of the received wireless LAN signal, the non-legacy terminal may recognize that the corresponding wireless LAN signal includes the non-legacy wireless LAN information.

In the embodiment of FIG. 17, the embodiment in which 4 additional data subcarriers are included in the second subcarrier set 820 is described, but the present invention is not limited thereto and different numbers of subcarriers may be included in a second subcarrier set 820. Further, the embodiment of FIG. 17 may be applied to a case where other bandwidths including 40 MHz, 80 MHz, and 160 MHz are used as well as a case where a bandwidth of the wireless LAN signal is 20 MHz.

FIG. 18 as yet another embodiment illustrates a method for representing the non-legacy wireless LAN information by using a predetermined bit field of the legacy preamble.

According to an additional embodiment of the present invention, the non-legacy wireless LAN information may be extracted from the predetermined bit field of the legacy preamble under a specific condition. FIG. 18 as an embodiment thereof illustrates a rate bit field included in the L-SIG of the legacy preamble. As illustrated in FIG. 18, a 4-th bit in the rate bit filed of the existing legacy preamble is continuously set to 1. Therefore, information on a data rate, a modulation scheme, and a coding rate of the legacy wireless LAN signal may be obtained through former 3 bit values in the rate bit field. Accordingly, according to the embodiment of the present invention, whether the corresponding rate bit field represents the non-legacy wireless LAN information may be decided based on the 4-th bit value of the rate bit field. That is, when the 4-th bit of the rate bit field has a value of 1, the corresponding rate bit field may represent the existing information, that is, the data rate, the modulation scheme, and the coding rate. However, when the 4-th bit of the rate bit field has a value of 0, the corresponding rate bit field may represent the non-legacy wireless LAN information.

When it is determined that the rate bit field includes the non-legacy wireless LAN information, the BSS identifier information may be extracted from former 3 bit values of the corresponding rate bit field as illustrated in FIG. 18. However, the present invention is not limited thereto and the non-legacy wireless LAN information such as bandwidth information, channel information, an association identifier (AID), and the like of the non-legacy wireless LAN signal may be extracted from the rate bit field. In this case, actual rate information for the non-legacy terminal may be transmitted through the non-legacy preamble. Meanwhile, even when the rate bit field includes the non-legacy wireless LAN information, the legacy terminal may analyze the non-legacy wireless LAN information as rate information. For such a situation, by appropriately configuring a length field of the L-SIG, the legacy terminals may perform a transmission delay (NAV configuration, and the like) by using L-SIG length information of other terminal packets when the transmission delay is required due to transmission of other terminals. In more detail, since the length field of the legacy preamble represents the size (the number of bytes) of transmission data, when information on the number of transmitted bits per OFDM symbol is obtained based on a modulation and coding scheme (MCS) and the length field is divided by the obtained information, the number of required OFDM symbols is determined. In this case, the network allocation vector (NAV) configuration may be performed according to the obtained number of OFDM symbols, and when the rate bit field is used as the non-legacy wireless LAN information in accordance with the embodiment of the present invention, the NAV may be configured as large as a required length by adjusting the length field.

As such, according to the embodiment of the present invention, based on information on predetermined specific bits of the legacy preamble, whether the corresponding legacy preamble includes the non-legacy wireless LAN information may be determined. When it is determined that the legacy preamble includes the non-legacy wireless LAN information, the non-legacy wireless LAN information such as the BSS identifier information, and the like may be extracted from the predetermined bit field of the legacy preamble, for instance, the rate bit field.

Meanwhile, according to an additional embodiment of the present invention, information on more bits may be secured by using a combination of the second subcarrier set of the legacy preamble and the specific bit field (that is, rate bit field), and as a result, the non-legacy wireless LAN information may be transferred. For example, when the legacy preamble is configured to additionally include the second subcarrier set, the non-legacy terminal may determine that the corresponding legacy preamble includes the non-legacy wireless LAN information and extract the BSS identifier information from all or some of 4 bits in the rate bit field. Furthermore, when the legacy preamble is configured to additionally include the second subcarrier set, the non-legacy terminal may analyze the entirety of the L-SIG bit field of the legacy preamble as the non-legacy wireless LAN information. As such, according to the embodiment of FIG. 18, since at least some of non-legacy wireless LAN information such as the BSS identifier information, and the like may be obtained from the legacy preamble before checking the non-legacy preamble, the CCA may be performed within a shorter time.

Figure 19:
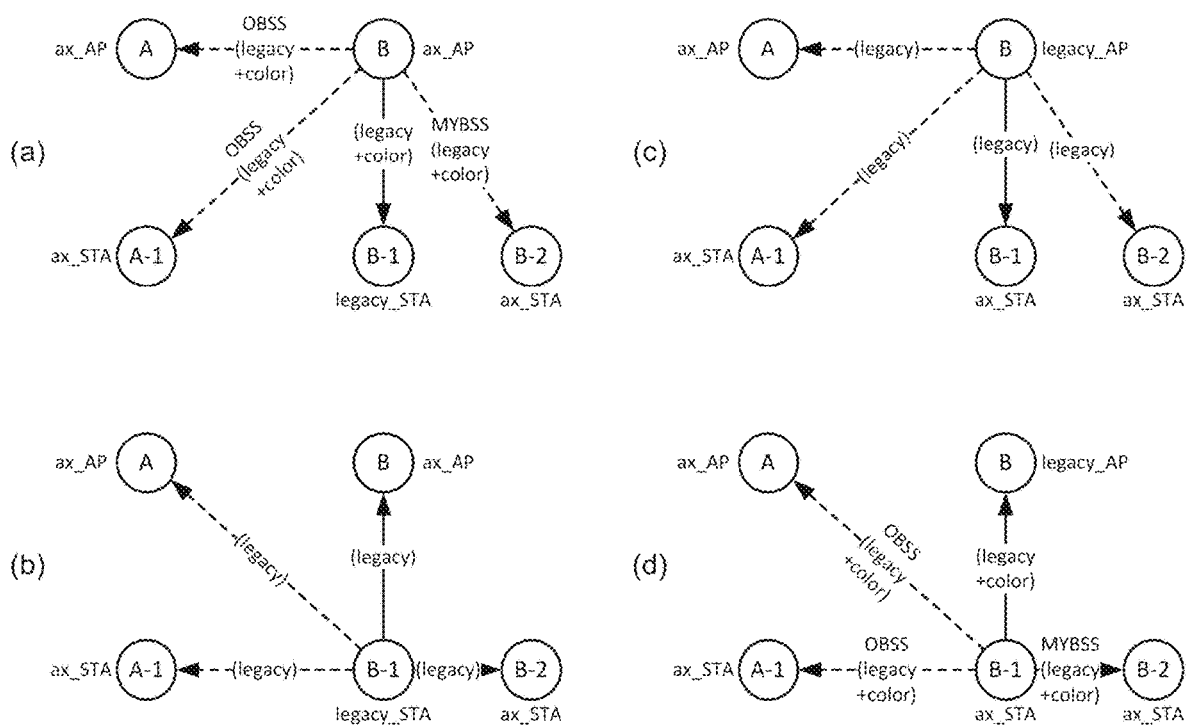
FIG. 19 is a diagram illustrating an embodiment of the present invention for transmitting and receiving data between a non-legacy terminal and a legacy terminal.

FIG. 19 illustrates an embodiment of the present invention for transmitting and receiving data between a non-legacy terminal and a legacy terminal. In the embodiment of FIG. 19, ax AP and ax STA represent a non-legacy AP and a non-legacy STA, respectively. Also, legacy AP and legacy STA represent a legacy AP and a legacy STA that support legacy WLAN standards (e.g., 802.11a/g/n/ac standards), respectively. According to the embodiment of the present invention, a wireless LAN signal in the legacy frame format can be transmitted not only by the legacy terminals but also by the non-legacy terminals. That is, the non-legacy terminal can transmit the wireless LAN signal in the legacy frame format when transmitting the signal to the legacy terminal.

FIGS. 19 (*a*) and 19 (*b*) illustrate an embodiment that a non-legacy AP 'A' and a non-legacy STA 'A-1' constitute one BSS and a non-legacy AP 'B', a legacy STA 'B-1' and a non-legacy STA 'B-2' constitute another BSS.

First, according to the embodiment of FIG. 19 (*a*), the non-legacy AP 'B' transmits a wireless LAN signal in the legacy frame format to the legacy STA 'B-1'. According to an embodiment, non-legacy wireless LAN information may be included in the wireless LAN signal in the legacy frame format transmitted by the non-legacy terminal. In this case, the non-legacy wireless LAN information may include BSS color information. The BSS color information may represent abbreviated information of the BSS identifier or information of a predetermined type for distinguishing different BSSs. The non-legacy terminals extract the BSS color information from the wireless LAN signal in the legacy frame format and perform the CCA based on the extracted BSS color information. More specifically, the terminals 'A' and 'A-1' may identify the corresponding wireless LAN signal to be a wireless signal of the other BSS (i.e., OBSS) based on the extracted BSS color information, and may perform the CCA based on the aforementioned second CCA threshold (i.e., the second CCA-SD threshold). In addition, the terminal B-2 may identify the corresponding wireless LAN signal to be the wireless LAN signal of the same BSS (i.e., MYBSS) based on the extracted BSS color information, and may perform the CCA based on the first CCA threshold (i.e., the first CCA-SD threshold).

However, when the legacy STA 'B-1' transmits the WLAN signal in the legacy frame format to the non-legacy AP 'B' as in the embodiment of FIG. 19 (*b*), the BSS color information is not included in the corresponding signal. Therefore, the terminals receiving the legacy wireless LAN signal may perform the CCA using only the signal strength information of the corresponding signal.

Next, FIGS. 19 (*c*) and 19 (*d*) illustrate an embodiment that a non-legacy AP 'A' and a non-legacy STA 'A-1' constitute one BSS and a legacy AP 'B', a non-legacy STAs 'B-1' and 'B-2' constitute another BSS. According to the embodiment of FIG. 19 (*c*), the wireless LAN signal in the legacy frame format transmitted by the legacy AP 'B' does not include BSS color information. Therefore, terminals receiving the legacy wireless LAN signal may perform the CCA using only the signal strength information of the corresponding signal. However, when the non-legacy STA 'B-1' transmits the wireless LAN signal in the legacy frame format to the legacy AP 'B' as in the embodiment of FIG. 19 (*d*), the BSS color information may be included in the corresponding signal. Accordingly, non-legacy terminals receiving the corresponding signal may extract the BSS color information from the corresponding signal and perform the CCA based on the extracted BSS color information, as described above with reference to FIG. 19 (*a*).

According to an embodiment of the present invention, BSS identifier information may be included in the corresponding signal even when a legacy wireless LAN signal is transmitted, and the non-legacy terminal may adjust the CCA threshold based on the BSS identifier information extracted from the corresponding signal. In this case, when the corresponding signal is a wireless LAN signal of the same BSS (i.e., MYBSS), the non-legacy terminal performs the CCA based on the predetermined first CCA threshold. However, when the corresponding signal is a wireless LAN signal of another BSS (i.e., OBSS), the non-legacy terminal performs the CCA based on a predetermined second CCA threshold higher than the first CCA threshold.

Figure 20:
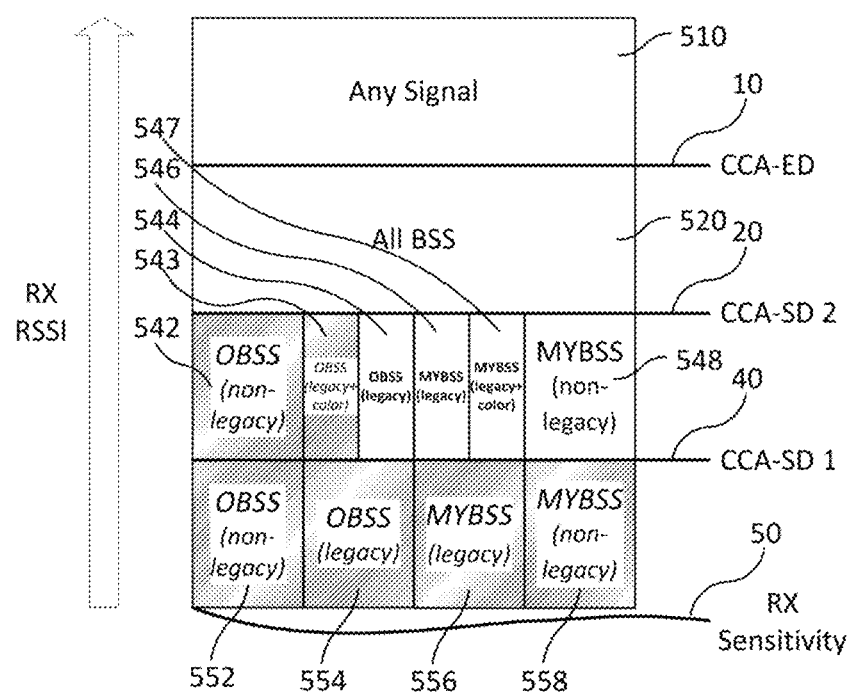
FIG. 20 is a diagram illustrating a further embodiment of a CCA method according to the present invention.

FIG. 20 illustrates a further embodiment of a CCA method according to the present invention. In the embodiment of FIG. 20, duplicative description of parts, which are the same as or correspond to the aforementioned embodiments of FIGS. 8 to 13, will be omitted.

According to a further embodiment of the present invention, a legacy wireless LAN signal, i.e. a wireless LAN signal having a legacy frame format, can be further classified. The wireless LAN signal having the legacy frame format may include the BSS identifier information. Here, the BSS identifier information includes the BSS identifier itself or the abbreviated information of the identifier (i.e., BSS color). According to an exemplary embodiment, the wireless LAN signal having the legacy frame format may indicate BSS identifier information through separate non-legacy wireless LAN information. According to another embodiment, the wireless LAN signal having the legacy frame format may indicate BSS identifier information through MAC address information included in at least one field of a MAC header. The wireless LAN signal having the legacy frame format may include the MAC address of the AP in at least one of a transmitter address (TA) and a receiver address (RA) of the MAC header, whereby the BSS identifier information of the corresponding signal can be extracted. However, in the case of a frame in a predetermined format (e.g., a legacy CTS frame, a legacy ACK frame, etc.) in which the MAC address of the AP is not included in the MAC header, the BSS identifier information may not be extracted from the corresponding signal.

In the embodiment of FIG. 20, the wireless signal 543 represents a legacy wireless LAN signal of another BSS (i.e., OBSS) from which BSS identifier information is extracted, and the wireless signal 544 represents a legacy wireless LAN signal of another BSS (i.e., OBSS) from which BSS identifier information is not extracted. In addition, the wireless signal 546 represents a legacy wireless LAN signal of the same BSS (i.e., MYBSS) from which BSS identifier information is not extracted, and the wireless signal 547 represents a legacy wireless LAN signal of the same BSS (i.e., MYBSS) from which BSS identifier information is extracted.

The legacy WLAN signals 543 and 547 from which BSS identifier information is extracted may include the BSS identifier information according to various embodiments. As described above, the corresponding signal may include the BSS identifier information through separate non-legacy wireless LAN information. Alternatively, the corresponding signal may include the BSS identifier information through MAC address information included in at least one field of the MAC header. Meanwhile, the legacy wireless LAN signals 544 and 546 in the predetermined frame format from which the BSS identifier information is not extracted do not include the non-legacy wireless LAN information and do not include the BSS identifier information in the MAC header. According to an embodiment, the wireless LAN signals 544 and 546 may include a legacy CTS frame, a legacy ACK frame, and the like, but the present invention is not limited thereto.

Referring to FIG. 20, when the received signal strength RX RSSI of the received wireless signal of a specific channel is the RX sensitivity 50 or more and the first CCA-SD threshold 40 or less, the corresponding channel is determined to be idle. When the received signal strength RX RSSI of the received wireless signal of the specific channel is higher than the first CCA-SD threshold 40, the terminal adjusts the CCA threshold according to whether the wireless signal is a wireless LAN signal of the same BSS as the corresponding terminal.

First, when the received wireless signal is identified to be a wireless LAN signal of another BSS (i.e., OBSS), the terminal adjusts the threshold for performing CCA to the second CCA-SD threshold 20 and performs the CCA using the second CCA-SD threshold 20. More specifically, the cases in which a received wireless signal is identified to be the wireless LAN signal of another BSS (i.e., OBSS) are as follows. i) In case that the received wireless signal 542 includes non-legacy wireless LAN information, and BSS identifier information extracted from the non-legacy wireless LAN information indicates a different BSS from that of the corresponding terminal. ii) In case that the received wireless signal 543 has the legacy frame format but includes the BSS identifier information, and the BSS identifier information indicating the same BSS as that of the corresponding terminal is not extracted from the corresponding signal 543. At this time, in the case ii), the wireless signal 543 may indicate the BSS identifier information through the MAC address included in the MAC header. If the signal strength of the received wireless signal is higher than the second CCA-SD threshold 20, the terminal determines that the channel is busy. However, if the signal strength of the received wireless signal is lower than the second CCA-SD threshold 20, the terminal determines that the channel is idle.

On the other hand, when the received wireless signal is identified to be a wireless LAN signal of the same BSS (i.e., MYBSS), the terminal performs CCA using the first CCA-SD threshold 40 without changing the threshold for performing the CCA. More specifically, the cases in which a received wireless signal is identified to be the wireless LAN signal of the same BSS (i.e., MYBSS) are as follows. i) In case that the received wireless signal 548 includes non-legacy wireless LAN information, and BSS identifier information extracted from the non-legacy wireless LAN information indicates the same BSS as that of the corresponding terminal. ii) In case that the received wireless signal 547 has the legacy frame format but includes the BSS identifier information, and the BSS identifier information indicating the same BSS as that of the corresponding terminal is extracted from the corresponding signal 547. At this time, in the case ii), the wireless signal 547 may indicate the BSS identifier information through the MAC address included in the MAC header. iii) In case that the received wireless signals 544 and 546 are legacy wireless LAN signals in a predetermined frame format that do not have the BSS identifier information. According to an embodiment, the wireless signals 544 and 546 in case iii) include a legacy CTS frame, a legacy ACK frame, and the like. In this case, since the signal strength of the received wireless signal is higher than the first CCA-SD threshold 20, the terminal determines that the channel is busy.

FIGS. 21 to 25 illustrate various embodiments of the present invention in which a wireless communication terminal performs the backoff procedure to transmit data. According to the embodiment of the present invention, the terminal may perform the backoff procedure using the first CCA threshold or the second CCA threshold determined according to the aforementioned embodiments.

As described with reference to FIG. 5, a terminal which intends to transmit data performs a backoff procedure 80 a predetermined IFS time (e.g., 1st AIFS) after a channel becomes idle. In this case, the backoff procedure 80 is performed based on the first CCA threshold. If a wireless signal 600 having a signal strength higher than a predetermined first CCA threshold is received through the corresponding channel, the terminal suspends the backoff procedure 80 and identifies whether the corresponding signal 600 is a wireless signal of the same BSS as that of the terminal. Whether it is the wireless signal of the same BSS as that of the terminal is identified based on the BSS identifier information extracted from the corresponding signal 600. According to an embodiment of the present invention, the BSS identifier information may be extracted from any one of i) a non-legacy preamble, ii) non-legacy wireless LAN information of a legacy preamble, and iii) a MAC address of a MAC header of the wireless signal.

The terminal determines whether to resume the backoff procedure based on the CCA threshold determined according to the identification result. If it is identified that the received wireless signal 600 is a wireless signal of a different BSS with the terminal, the terminal determines whether to resume the backoff procedure using the second CCA threshold higher than the first CCA threshold. Hereinafter, the embodiments of FIGS. 21 to 25 will be described on the assumption that the backoff counter of the terminal is set to 3.

Figure 21:
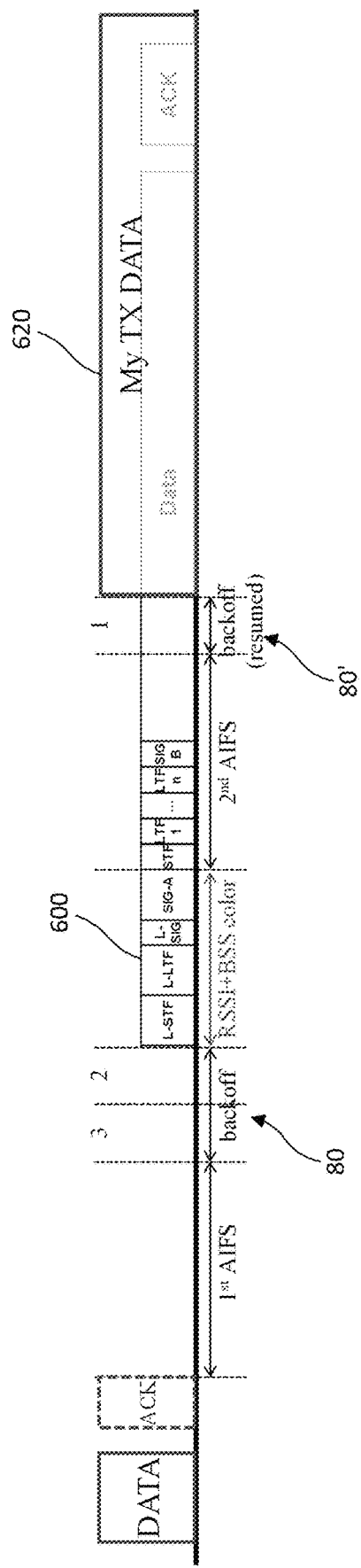
FIGS. 21 to 25 are diagrams illustrating various embodiments of the present invention in which a wireless communication terminal performs the backoff procedure to transmit data.

FIG. 21 illustrates an embodiment in which the BSS identifier information is extracted from the non-legacy preamble of the wireless signal 600. According to an embodiment of the present invention, the wireless signal 600 may include BSS color information in a predetermined field of a non-legacy preamble, such as non-legacy SIG-A. When the BSS color information is extracted, the terminal identifies whether the corresponding wireless signal 600 is a wireless signal of the same BSS as the terminal with reference to the extracted BSS color information. If the corresponding signal 600 is identified to be a wireless signal of a different BSS with the terminal, the terminal determines whether to resume the backoff procedure using the second CCA threshold higher than the first CCA threshold. When the signal strength of the corresponding signal 600 is higher than the second CCA threshold, the terminal determines that the channel is busy and continues to suspend the backoff procedure 80. However, when the signal strength of the corresponding signal 600 is lower than the second CCA threshold, the terminal determines that the channel is idle and resumes the backoff procedure 80' after a predetermined IFS time (i.e., 2nd AIFS). In this case, the predetermined IFS may be an AIFS. The resumed backoff procedure 80' is performed using a remaining backoff counter in the previous backoff procedure 80. When the backoff counter of the backoff procedure 80' expires, the terminal transmits data 620.

Figure 22:
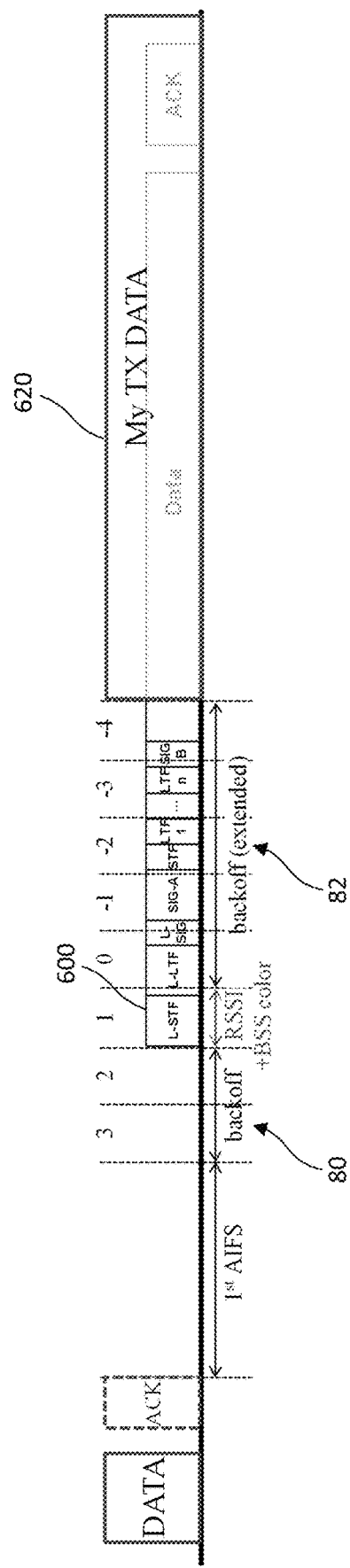

FIG. 22 illustrates an embodiment in which the BSS identifier information is extracted from the legacy preamble of the wireless signal 600. According to another embodiment of the present invention, the wireless signal 600 may indicate the BSS identifier information through additional information of the legacy preamble. A specific embodiment is as illustrated in FIGS. 14 to 18. When the BSS identifier information is included in the legacy preamble of the wireless signal 600, the BSS identifier information may be extracted from the wireless signal 600 in a short period of time. According to an embodiment, the BSS identifier information may be extracted within one slot period after the wireless signal 600 is received.

When the BSS identifier information is extracted, the terminal identifies whether the corresponding wireless signal 600 is a wireless signal of the same BSS as the terminal by referring to the extracted BSS identifier information. If the corresponding signal 600 is determined to be a wireless signal of a different BSS with the terminal, the terminal determines whether to resume the backoff procedure using the second CCA threshold higher than the first CCA threshold. When the signal strength of the corresponding signal 600 is higher than the second CCA threshold, the terminal determines that the channel is busy and continues to suspend the backoff procedure 80. However, when the signal strength of the corresponding signal 600 is lower than the second CCA threshold, the terminal determines that the channel is idle and resumes the backoff procedure.

However, if the previous backoff procedure 80 is resumed and the data 620 is transmitted immediately after the BSS identifier information of the wireless signal 600 is identified, the preamble portion of the wireless signal 600 and the transmitted data 620 signal of the terminal may collide with each other. Since the preamble of the wireless signal 600 includes important information necessary for receiving the data of the corresponding signal, a method for protecting the preamble is needed. Therefore, according to the embodiment of the present invention, the terminal performs an extended backoff procedure 82 after identifying the BSS identifier information of the wireless signal 600 to delay the transmission of the data 620 until the preamble transmission of the wireless signal 600 is completed.

The backoff counter of the extended backoff procedure 82 may be set to a reserved value or may be set based on the remaining time until the preamble transmission of the wireless signal 600 is completed. In the embodiment of FIG. 22, an extended backoff procedure 82 in which a backoff counter 5 is assigned is shown. When the extended backoff procedure 82 is terminated, the terminal transmits data 620. Meanwhile, if the transmission of the data 620 of the terminal is further delayed due to the extended backoff procedure 82, compensation for the next round channel access of the terminal may be performed. That is, in the next round channel access, the terminal may perform a backoff procedure using a counter obtained by subtracting the backoff counter used in the previous extended backoff procedure 82 from a randomly selected backoff counter in the corresponding round.

Meanwhile, if the preamble transmission of the wireless signal 600 is not completed until the resumed backoff procedure 80' is terminated in the embodiment of FIG. 21, the terminal may additionally perform the extended backoff procedure 82 as in the embodiment of FIG. 22.

Figure 23:
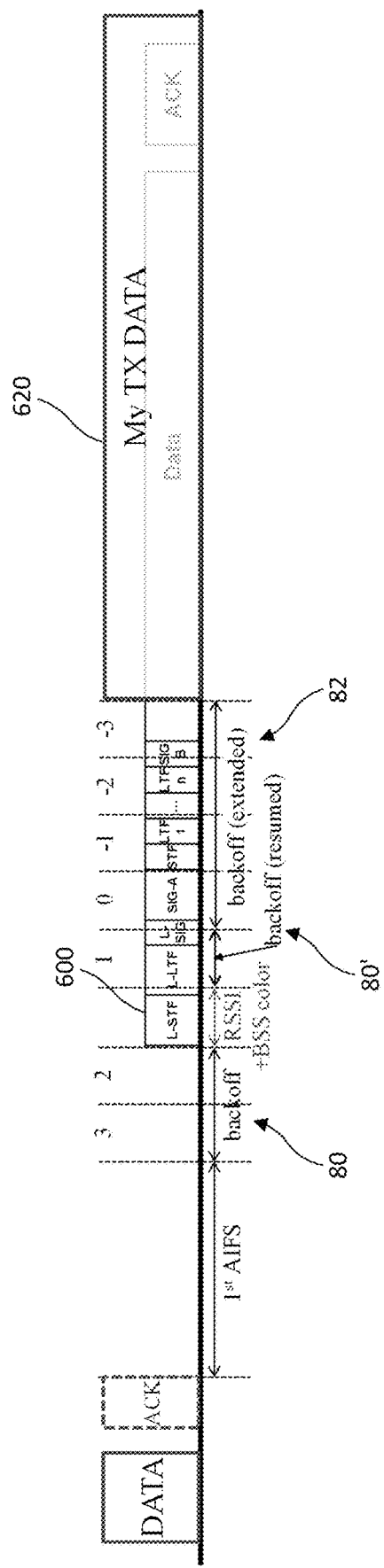
Figure 24:
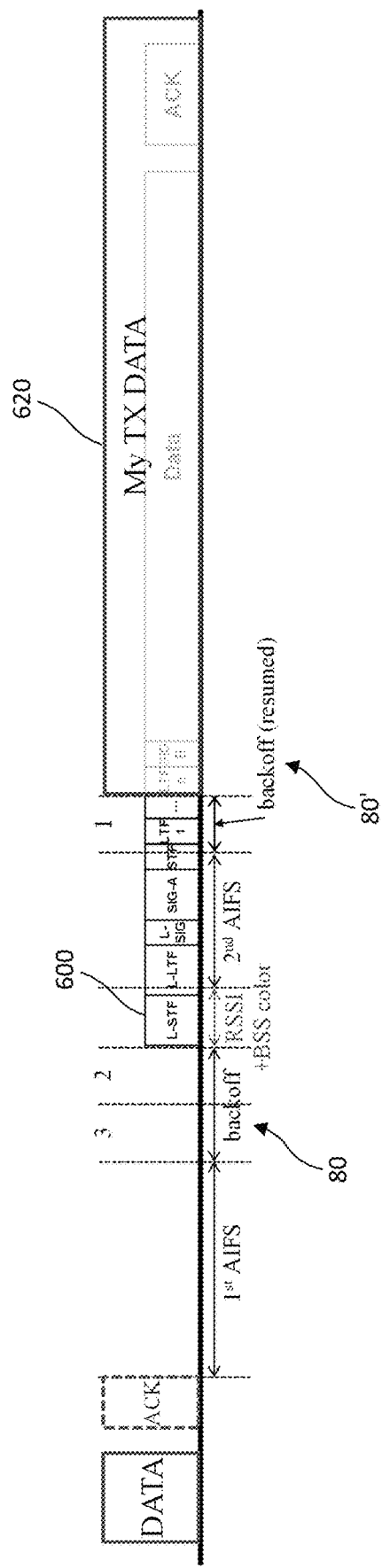
Figure 25:
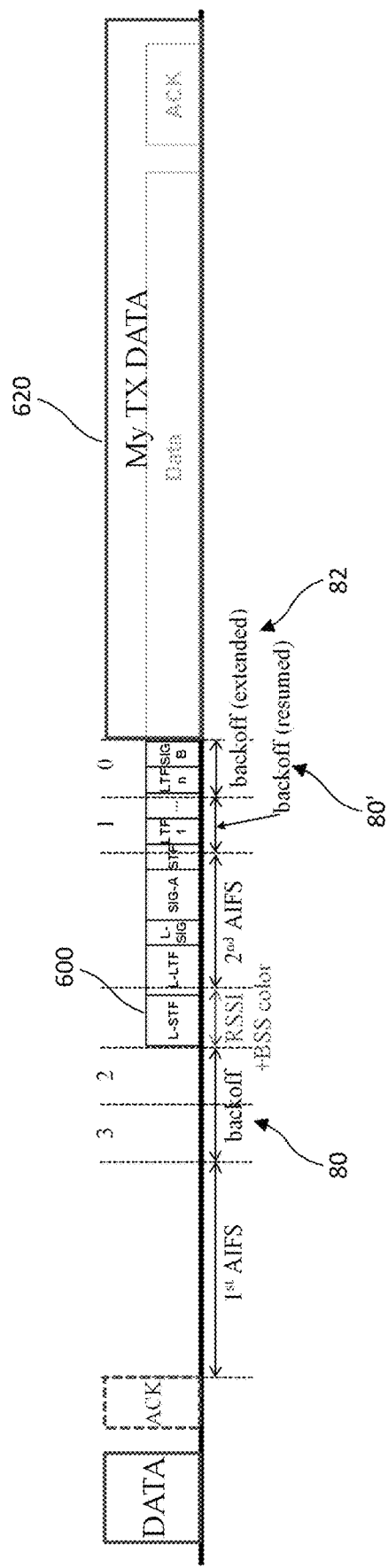

FIGS. 23 to 25 illustrate modified embodiments of the embodiments of FIGS. 21 and 22. In the embodiments of FIGS. 23 to 25, duplicative description of parts, which are the same as or correspond to the aforementioned embodiments of FIGS. 21 and 22, will be omitted.

First, according to the embodiment of FIG. 23, the terminal may resume the backoff procedure 80' after identifying the BSS identifier information of the wireless signal 600, and may delay the transmission of data 620 by performing the extended backoff procedure when the resumed backoff procedure 80' is terminated. The resumed backoff procedure 80' is performed using a remaining backoff counter in the previous backoff procedure 80. When the resumed backoff procedure 80' is terminated, the terminal immediately performs the extended backoff procedure 82. The backoff counter used in the extended backoff procedure 82 may be determined as described in the embodiment of FIG. 22, and when the extended backoff procedure 82 is terminated, the terminal transmits data 620.

Next, according to the embodiment of FIG. 24, the terminal may resume the backoff procedure 80' a predetermined IFS time (i.e., 2nd AIFS) after identifying the BSS identifier information of the wireless signal 600. In this case, the predetermined IFS may be an AIFS. When the backoff counter of the backoff procedure 80' expires, the terminal transmits data 620.

Next, according to the embodiment of FIG. 25, the terminal may resume the backoff procedure 80' a predetermined IFS time (i.e., 2nd AIFS) after identifying the BSS identifier information of the wireless signal 600, and may perform the extended backoff procedure 82 when the resumed backoff procedure 80' us terminated to delay the transmission of the data 620. A specific embodiment of the resumed backoff procedure 80' and the extended backoff procedure 82 is as described above. When the extended backoff procedure 82 is terminated, the terminal transmits data 620.

Meanwhile, in the embodiments of FIGS. 21 to 25, when the received signal 600 is identified to be a wireless signal of the same BSS as the terminal, the terminal performs the CCA by using the first CCA threshold without changing the threshold for performing the CCA. Therefore, the terminal determines that the channel is busy and continues to suspend the backoff procedure 80. In addition, FIGS. 21 to 25 illustrate embodiments in which the BSS identifier information is included in the non-legacy preamble of the wireless signal 600 or the non-legacy wireless LAN information of the legacy preamble of the wireless signal 600. However, as described above, the BSS identifier information may be included in the MAC header as MAC address information, or may be included in the wireless signal 600 in other forms.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICS s), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

MODE FOR INVENTION

As above, related features have been described in the best mode.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, the terminal comprising:
   a processor; and
   a communication unit,
   wherein the processor is configured to:
   receive a preamble of a wireless frame via a specific channel using the communication unit,
   wherein the preamble includes basic service set (BSS) identifier information,
   compare a received signal strength of the preamble within the specific channel with a predetermined first threshold,
   identify, based on the BSS identifier information included in the wireless frame, whether the wireless frame is transmitted from a BSS which the terminal is associated or other BSS which the terminal is not associated when the received signal strength is greater than or equal to the predetermined first threshold, and
   compare the received signal strength of the preamble with a predetermined second threshold to identify a status of the specific channel when the wireless frame is transmitted from the other BSS.

2. The wireless communication terminal of claim 1, wherein the predetermined second threshold is equal to or greater than the predetermined first threshold.

3. The wireless communication terminal of claim 1,
wherein the status of the specific channel is determined to be busy when the wireless frame is transmitted from the other BSS and the received signal strength is greater than or equal to the predetermined second threshold.

4. The wireless communication terminal of claim 1,
wherein the status of the specific channel is determined to be idle when the wireless frame is transmitted from the other BSS and the received signal strength is below the predetermined second threshold.

5. The wireless communication terminal of claim 1,
wherein the BSS identifier information is a BSS color information or a medium access control (MAC) address information.

6. The wireless communication terminal of claim 1,
wherein whether the wireless frame is transmitted from the BSS or the other BSS is identified based on whether the BSS identifier information included in the preamble is the same as BSS identifier information of the BSS.

7. The wireless communication terminal of claim 6,
wherein the wireless frame is identified as transmitted from the BSS when the BSS identifier information included in the preamble is the same as the BSS identifier information of the BSS.

8. The wireless communication terminal of claim 6,
wherein the wireless frame is identified as transmitted from the other BSS when the BSS identifier information included in the preamble is not the same as the identifier information of the BSS.

9. A wireless communication method of a terminal, the method comprising:
receiving a preamble of a wireless frame via a specific channel,
wherein the preamble includes basic service set (BSS) identifier information;
comparing a received signal strength of the preamble within the specific channel with a predetermined first threshold;
identifying, based on the BSS identifier information included in the wireless frame, whether the wireless frame is transmitted from a BSS which the terminal is associated or other BSS which the terminal is not associated when the received signal strength is greater than or equal to the predetermined first threshold; and
comparing the received signal strength of the preamble with a predetermined second threshold to identify a status of the specific channel when the wireless frame is transmitted from the other BSS.

10. The wireless communication terminal of claim 9,
wherein the predetermined second threshold is equal to or greater than the predetermined first threshold.

11. The wireless communication terminal of claim 9,
wherein the status of the specific channel is determined to be busy when the wireless frame is transmitted from the other BSS and the received signal strength is greater than or equal to the predetermined second threshold.

12. The wireless communication terminal of claim 9,
wherein the status of the specific channel is determined to be idle when the wireless frame is transmitted from the other BSS and the received signal strength is below the predetermined second threshold.

13. The wireless communication terminal of claim 9,
wherein the BSS identifier information is a BSS color information or a medium access control (MAC) address information.

14. The wireless communication terminal of claim 9,
wherein whether the wireless frame is transmitted from the BSS or the other BSS is identified based on whether the BSS identifier information included in the preamble is the same as BSS identifier information of the BSS.

15. The wireless communication terminal of claim 14,
wherein the wireless frame is identified as transmitted from the BSS when the BSS identifier information included in the preamble is the same as the BSS identifier information of the BSS.

16. The wireless communication terminal of claim 14,
wherein the wireless frame is identified as transmitted from the other BSS when the BSS identifier information included in the preamble is not the same as the identifier information of the BSS.

* * * * *